US012531696B2

(12) United States Patent
Xie et al.

(10) Patent No.: US 12,531,696 B2
(45) Date of Patent: Jan. 20, 2026

(54) SIGNAL TRANSMISSION METHOD FOR NOTIFYING A TERMINAL DEVICE OF A DEMODULATION REFERENCE SIGNAL (DMRS) PORT WITH STRONG INTERFERENCE AND RELATED APPARATUS

(71) Applicant: HUAWEI TECHNOLOGIES CO., LTD., Shenzhen (CN)

(72) Inventors: Xinqian Xie, Beijing (CN); Zhiheng Guo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 396 days.

(21) Appl. No.: 18/175,129

(22) Filed: Feb. 27, 2023

(65) Prior Publication Data

US 2023/0224127 A1   Jul. 13, 2023

Related U.S. Application Data

(63) Continuation of application No. PCT/CN2020/112741, filed on Aug. 31, 2020.

(51) Int. Cl.
*H04L 5/00* (2006.01)
(52) U.S. Cl.
CPC .......... *H04L 5/0051* (2013.01); *H04L 5/0016* (2013.01)
(58) Field of Classification Search
CPC ... H04L 5/0016; H04L 5/0026; H04L 5/0048; H04L 5/0051; H04L 5/0073; H04L 5/0092; H04L 5/0094; H04W 72/23; H04W 72/232
See application file for complete search history.

(56) References Cited

U.S. PATENT DOCUMENTS

| 11,626,948 | B2 * | 4/2023 | Kwak | ................... H04B 7/088 370/329 |
| 2016/0087708 | A1 * | 3/2016 | Kang | ................... H04B 7/0626 370/312 |
| 2021/0297121 | A1 * | 9/2021 | Hao | ................... H04L 5/0053 |
| 2021/0320772 | A1 * | 10/2021 | Zewail | ................... H04L 5/0051 |

(Continued)

FOREIGN PATENT DOCUMENTS

| CN | 105531949 A | 4/2016 |
| CN | 107371254 A | 11/2017 |

(Continued)

OTHER PUBLICATIONS

Extended European Search Report issued in corresponding European Application No. 20950957.9, dated Sep. 28, 2023, pp. 1-9.

(Continued)

*Primary Examiner* — Pao Sinkantarakorn
(74) *Attorney, Agent, or Firm* — HAUPTMAN HAM, LLP

(57) ABSTRACT

A signal transmission method and a related apparatus. First indication information indicates one or more demodulation reference signal DMRS port sets. Second indication information indicates N first DMRS ports associated with a first signal, where N is greater than or equal to 1. A terminal device receives the first indication information, the second indication information, and processes the first signal based on the first indication information and the second indication information.

16 Claims, 7 Drawing Sheets

(56) References Cited

U.S. PATENT DOCUMENTS

2023/0007680 A1* 1/2023 Aiba ................ H04W 72/23
2024/0259078 A1* 8/2024 Gao ................ H04W 16/28

FOREIGN PATENT DOCUMENTS

| CN | 111183594 A  | 5/2020 |
| CN | 111586873 A  | 8/2020 |
| WO | 2018028368 A1 | 2/2018 |
| WO | 2020034936 A1 | 2/2020 |

OTHER PUBLICATIONS

ZTE et al Discussion on downlink DMRS design 3GPP TSG RANWG1 NR Ad-Hoc Meeting R1-1700135, Jan. 20, 2017, total 10 pages.

\* cited by examiner

SIGNAL TRANSMISSION METHOD FOR NOTIFYING A TERMINAL DEVICE OF A DEMODULATION REFERENCE SIGNAL (DMRS) PORT WITH STRONG INTERFERENCE AND RELATED APPARATUS

CROSS-REFERENCE TO RELATED APPLICATIONS

This application is a continuation of International Application No. PCT/CN2020/112741, filed on Aug. 31, 2020, the disclosure of which is hereby incorporated by reference in its entirety.

BACKGROUND

Currently, in some communication scenarios, when receiving a downlink signal from a network device, a terminal device may be interfered with by another signal. For example, when a base station sends different signals to a plurality of terminal devices on a same time-frequency resource, for one of the signals, the other signals are all interfering signals. For another example, when a terminal device receives a downlink signal, and another terminal device sends an uplink signal, the uplink signal may be considered as an interfering signal for the downlink signal. The two terminal devices may be located in a same cell or neighboring cells. To suppress impact of an interfering signal on a wanted signal, the terminal device needs to learn of a demodulation reference signal (Demodulation Reference Signal, DMRS) port with strong interference. In this way, after learning of the DMRS port with strong interference, the terminal device may demodulate a signal that is from the network device, to suppress the interfering signal.

Therefore, how the network device notifies the terminal device of the DMRS port with strong interference is a problem that needs to be urgently resolved currently.

SUMMARY

Embodiments described herein provide a signal transmission method and a related apparatus, to help notify a terminal device of a DMRS port with strong interference.

According to a first aspect, at least one embodiment provides a signal transmission method. In the method, a terminal device receives first indication information and second indication information from a network device, receives a first signal from the network device, and processes the first signal based on the first indication information and the second indication information. The first indication information indicates one or more demodulation reference signal DMRS port sets, and the second indication information indicates N first DMRS ports associated with a first signal, where N is greater than or equal to 1.

The terminal device processes the first signal that is from the network device based on the first indication information and the second indication information, to suppress an interfering signal. In addition, the first indication information received by the terminal device is for notifying the terminal device of a DMRS port with strong interference by using the one or more DMRS port sets instead of separately indicating each DMRS port with strong interference. Therefore, the method helps reduce signaling overheads used for notifying the terminal device of the DMRS port with strong interference.

In an implementation, signals associated with DMRS ports in each DMRS port set are strongly correlated. Alternatively, signals associated with DMRS ports in each DMRS port set are mutual strong interfering signals. In this way, the terminal device determines the DMRS port with strong interference based on a DMRS port set including the first DMRS port, so that the terminal device demodulates the first signal that is from the network device based on the DMRS port with strong interference, to suppress the interfering signal.

In another implementation, signals associated with DMRS ports in each DMRS port set are weakly correlated. Alternatively, signals associated with DMRS ports in each DMRS port set do not interfere with each other. In this way, the terminal device determines the DMRS port with strong interference based on a DMRS port set not including the first DMRS port, so that the terminal device demodulates the first signal that is from the network device based on the DMRS port with strong interference, to suppress the interfering signal.

In an implementation, that the terminal device processes the first signal based on the first indication information includes: determining one or more second DMRS ports based on the first indication information and the second indication information; and demodulating the first signal based on a DMRS corresponding to the N first DMRS ports and a DMRS corresponding to the one or more second DMRS ports. The one or more second DMRS ports and the N first DMRS ports belong to a same DMRS port set.

In response to the signals associated with the DMRS ports in each DMRS port set being strongly correlated, or the signals associated with the DMRS ports in each DMRS port set being mutual strong interfering signals, the terminal device determines the one or more second DMRS ports in the DMRS port set to which the N first DMRS ports belong.

In another implementation, that the terminal device processes the first signal based on the first indication information includes: determining one or more second DMRS ports based on the first indication information and the second indication information; and demodulating the first signal based on a DMRS corresponding to the N first DMRS ports and a DMRS corresponding to the one or more second DMRS ports. The one or more second DMRS ports and the N first DMRS ports do not belong to a same DMRS port set.

In response to the signals associated with the DMRS ports in each DMRS port set being weakly correlated, or the signals associated with the DMRS ports in each DMRS port set not interfering with each other, the terminal device determines the one or more second DMRS ports in the DMRS port set not including the N first DMRS ports.

In an implementation, the first indication information is carried in group common downlink control information DCI. In other words, the terminal device receives the first indication information by using the group common DCI. In this case, instead of separately notifying each terminal device of the DMRS port with strong interference, the network device multicasts the first indication information to a plurality of terminal devices by using the group common DCI, so that signaling overheads of the network device is reduced.

According to a second aspect, at least one embodiment provides a signal transmission method. The signal transmission method in this aspect corresponds to the signal transmission method in the first aspect, and the signal transmission method in this aspect is described from a network device side. In the method, the network device determines first indication information and second indication information, sends the first indication information and the second indication information to a terminal device, and sends a first signal to the terminal device. The first indication information indicates one or more demodulation reference signal DMRS port sets, and the second indication information indicates N first DMRS ports associated with the first signal, where N is greater than or equal to 1.

In the method, the network device sends the first indication information to the terminal device, and further sends the second indication information indicating the N first DMRS ports associated with the first signal, so that the terminal device processes the first signal that is from the network device based on the first indication information and the second indication information, to suppress an interfering signal. In addition, the first indication information sent by the network device to the terminal device is for notifying the terminal device of a DMRS port with strong interference by using the one or more DMRS port sets instead of separately indicating each DMRS port with strong interference. Therefore, the method helps reduce signaling overheads used for notifying the terminal device of the DMRS port with strong interference.

In an implementation, signals associated with DMRS ports in each DMRS port set are strongly correlated. Alternatively, signals associated with DMRS ports in each DMRS port set are mutual strong interfering signals. This method helps the terminal device determine, based on the relationship, the DMRS port with strong interference in a DMRS port set including the first DMRS port, so that the terminal device processes the first signal that is from the network device based on the DMRS port with strong interference.

In another implementation, signals associated with DMRS ports in each DMRS port set are weakly correlated. Alternatively, signals associated with DMRS ports in each DMRS port set do not interfere with each other. This method helps the terminal device determine, based on the relationship, the DMRS port with strong interference in a DMRS port set not including the first DMRS port, so that the terminal device processes the first signal that is from the network device based on the DMRS port with strong interference.

In an implementation, the first indication information is carried in group common downlink control information DCI. In other words, instead of separately notifying each terminal device of the DMRS port with strong interference, the network device multicasts the first indication information to one or more terminal devices by using the group common DCI. This helps reduce signaling overheads of the network device.

According to a third aspect, at least one embodiment provides another signal transmission method. In the method, a terminal device receives downlink control information DCI from a network device; determines, based on a quantity of N first demodulation reference signal DMRS ports associated with a first signal and/or a quantity of code division multiplexing CDM groups that do not carry data, whether the DCI includes third indication information, and N is greater than or equal to 1; receives the first signal from the network device; and in response to the DCI including the third indication information, processes the first signal based on the third indication information and the N first DMRS ports; or in response to the DCI not including the third indication information, processes the first signal based on the N first DMRS ports. The third indication information indicates one or more second DMRS ports or a CDM group corresponding to one or more second DMRS ports, and the one or more second DMRS ports are different from the N first DMRS ports.

In response to the DCI including the third indication information, the terminal device directly learns of the one or more second DMRS ports by using the third indication information, and process the first signal based on the one or more second DMRS ports and the N first DMRS ports. This manner helps reduce processing complexity for the terminal device. In response to the DCI not including the third indication information, the terminal device alternatively processes the first signal based on the N first DMRS ports, to suppress an interfering signal. For the network device, in response to the DCI not including the third indication information, signaling overheads used for sending the DCI is reduced.

In an implementation, that the terminal device determines, based on a quantity of N first demodulation reference signal DMRS ports associated with a first signal and/or a quantity of code division multiplexing CDM groups that do not carry data, whether the DCI includes third indication information includes: in response to the quantity of N first DMRS ports associated with the first signal being less than a first preset value, and the quantity of CDM groups that do not carry data not being less than a second preset value, determining that the DCI includes the third indication information; or in response to the quantity of N first DMRS ports associated with the first signal not being less than a first preset value, or the quantity of CDM groups that do not carry data being less than a second preset value, determining that the DCI does not include the third indication information.

In an implementation, in response to the DCI including the third indication information, that the terminal device processes the first signal based on the third indication information includes: demodulating the first signal based on a DMRS corresponding to the N first DMRS ports and a DMRS corresponding to the one or more second DMRS ports; or demodulating the first signal based on a DMRS corresponding to the N first DMRS ports and a DMRS signal of a DMRS port in the CDM group corresponding to the one or more second DMRS ports. In response to determining that the DCI includes the third indication information, the terminal device directly learns of the one or more second DMRS ports by using the third indication information. This helps reduce the processing complexity for the terminal device.

In another implementation, in response to the DCI not including the third indication information, that the terminal device processes the first signal based on the N first DMRS ports includes: determining the one or more second DMRS ports based on the N first DMRS ports and the quantity of CDM groups that do not carry data; and demodulating the first signal based on a DMRS corresponding to the N first DMRS ports and a DMRS corresponding to the one or more second DMRS ports. In response to determining that the DCI does not include the third indication information, the terminal device alternatively determines the one or more second DMRS ports based on the N first DMRS ports and the quantity of CDM groups that do not carry data. For the network device, in response to the DCI not including the third indication information, content in the DCI sent by the network device is reduced, so that the signaling overheads of the network device is reduced.

In an implementation, the first preset value is a maximum quantity of receive antennas or a maximum quantity of data streams that are supported by the terminal device, and the second preset value is a maximum quantity of CDM groups configured by the network device.

In an implementation, the DCI includes second indication information, and the second indication information indicates the N first DMRS ports and the quantity of CDM groups that do not carry data. The second indication information and the third indication information are sent to the terminal device by using same DCI. This helps reduce the signaling overheads of the network device.

According to a fourth aspect, at least one embodiment provides another signal transmission method. The signal transmission method in this aspect corresponds to the signal transmission method in the third aspect, and the signal transmission method in this aspect is described from a network device side. In the method, the network device determines downlink control information DCI; sends the DCI to a terminal device; and sends a first signal to the terminal device. In response to a quantity of N first DMRS ports associated with the first signal being less than a first preset value, and a quantity of CDM groups that do not carry data not being less than a second preset value, the DCI includes third indication information. The third indication information indicates one or more second DMRS ports or a CDM group corresponding to one or more second DMRS ports, the one or more second DMRS ports are different from the N first DMRS ports, and N is greater than or equal to 1.

In response to the quantity of N first DMRS ports associated with the first signal being less than the first preset value, and the quantity of CDM groups that do not carry data not being less than the second preset value, the DCI sent by the network device to the terminal device includes the third indication information, so that the terminal device directly learns of the one or more second DMRS ports by using the third indication information. This helps reduce processing complexity for the terminal device. In response to the condition not being met, the DCI sent by the network device to the terminal device does not include the third indication information, and content in the DCI sent by the network device is reduced, so that signaling overheads of the network device is reduced.

In an implementation, the first preset value is a maximum quantity of receive antennas or a maximum quantity of data streams that are supported by the terminal device, and the second preset value is a maximum quantity of CDM groups configured by the network device.

In an implementation, the DCI includes second indication information, and the second indication information indicates the N first DMRS ports and the quantity of CDM groups that do not carry data. In other words, both the second indication information and the third indication information are sent to the terminal device by using same DCI. This helps reduce the signaling overheads of the network device.

According to a fifth aspect, at least one embodiment provides still another signal transmission method. In the method, a terminal device receives downlink control information DCI. The terminal device determines, based on fourth indication information in the DCI, whether the DCI includes third indication information. The terminal device receives a first signal from a network device. In response to the DCI including the third indication information, the terminal device processes the first signal based on the third indication information. In response to the DCI not including the third indication information, the terminal device processes the first signal based on N first DMRS ports associated with the first signal, where N is greater than or equal to 1. The DCI includes the fourth indication information. The fourth indication information indicates whether the DCI includes the third indication information. The third indication information indicates one or more second demodulation reference signal DMRS ports or a code division multiplexing CDM group corresponding to one or more second DMRS ports, and the one or more second DMRS ports are different from the N first DMRS ports associated with the first signal.

The terminal device directly determines, based on the fourth indication information, whether the DCI includes the third indication information. Compared with the manner of determining, based on the quantity of first DMRS ports and/or the quantity of CDM groups that do not carry data, whether the DCI includes the third indication information, this manner helps the terminal device more intuitively and quickly determine whether the DCI includes the third indication information, and reduces processing complexity for the terminal device.

In an implementation, that the terminal device determines, based on the fourth indication information, whether the DCI further includes the third indication information includes: In response to the fourth indication information indicating a first state, the terminal device determines that the DCI includes the third indication information. In response to the fourth indication information indicating a second state, the terminal device determines that the DCI does not include the third indication information.

In an implementation, in response to the DCI including the third indication information, that the terminal device processes the first signal based on the third indication information includes: The terminal device demodulates the first signal based on a DMRS corresponding to the N first DMRS ports associated with the first signal and a DMRS corresponding to the one or more second DMRS ports. Alternatively, the terminal device demodulates the first signal based on a DMRS corresponding to the N first DMRS ports associated with the first signal and a DMRS of a DMRS port in the CDM group corresponding to the one or more second DMRS ports.

In an implementation, in response to the DCI not including the third indication information, that the terminal device processes the first signal based on the N first DMRS ports associated with the first signal includes: The terminal device determines the one or more second DMRS ports based on the N first DMRS ports associated with the first signal and the quantity of code division multiplexing CDM groups that do not carry data. The terminal device demodulates the first signal based on a DMRS corresponding to the N first DMRS ports and a DMRS corresponding to the one or more second DMRS ports.

In response to the DCI including the third indication information, the terminal device directly learns of the one or more second DMRS ports based on the third indication information. This helps reduce the processing complexity for the terminal device. In response to the DCI not including the third indication information, the terminal device alternatively determines the one or more second DMRS ports based on the N first DMRS ports and the quantity of code division multiplexing CDM groups that do not carry data. This manner helps reduce signaling overheads of the network device.

In an implementation, the DCI includes second indication information, and the second indication information indicates the N first DMRS ports and the quantity of CDM groups that do not carry data. In other words, both the fourth indication information and the second indication information are sent to the terminal device by using same DCI. This helps reduce the signaling overheads of the network device.

According to a sixth aspect, at least one embodiment provides still another signal transmission method. The signal transmission method in this aspect corresponds to the signal transmission method in the fifth aspect, and the signal transmission method in this aspect is described from a network device side. In the method, the network device sends downlink control information DCI to a terminal device, and sends a first signal to the terminal device. The DCI includes fourth indication information. In response to indicating a first state, the fourth indication information indicates that the DCI includes third indication information. The third indication information indicates one or more second demodulation reference signal DMRS ports or a code division multiplexing CDM group corresponding to one or more second demodulation reference signal DMRS ports, and the one or more second DMRS ports are different from N first DMRS ports associated with the first signal.

The DCI sent by the network device to the terminal device includes the third indication information only in response to the fourth indication information indicating the first state. However, in response to the fourth indication information indicating a second state, the DCI sent to the terminal device does not include the third indication information. Therefore, in response to the DCI not including the third indication information, content in the DCI sent by the network device is reduced, so that signaling overheads of the network device is reduced.

In an implementation, in response to a quantity of N first DMRS ports associated with the first signal being less than a first preset value, and a quantity of CDM groups that do not carry data not being less than a second preset value, the network device determines that the fourth indication information indicates the first state, where N is greater than or equal to 1. Alternatively, in response to a quantity of N first DMRS ports associated with the first signal not being less than a first preset value, or a quantity of CDM groups that do not carry data being less than a second preset value, the network device determines that the fourth indication information indicates the second state.

In an implementation, the first preset value is a maximum quantity of receive antennas or a maximum quantity of data streams that are supported by the terminal device, and the second preset value is a maximum quantity of CDM groups configured by the network device.

In an implementation, the DCI includes second indication information, and the second indication information indicates the N first DMRS ports and the quantity of CDM groups that do not carry data. In other words, the second indication information and the fourth indication information are sent to the terminal device by using same DCI, so that the signaling overheads of the network device is reduced.

According to a seventh aspect, at least one embodiment further provides a communication apparatus. The communication apparatus has all or a part of functions of implementing the terminal device according to the first aspect, the third aspect, or the fifth aspect. For example, functions of the communication apparatus includes functions of the terminal device in all or a part of at least one embodiment, or includes functions of separately implementing at least one embodiment. The function is implemented by hardware, or is implemented by hardware executing corresponding software. The hardware or the software includes one or more units or modules corresponding to the functions.

In at least one embodiment, a structure of the communication apparatus includes a processing unit and a communication unit. The processing unit is configured to support the communication apparatus in performing a corresponding function in the foregoing method. The communication unit is configured to support communication between the communication apparatus and another communication apparatus. The communication apparatus further includes a storage unit. The storage unit is configured to be coupled to the processing unit and the communication unit, and the storage unit stores program instructions and data that are necessary for the communication apparatus.

In an implementation, the communication apparatus includes the communication unit and the processing unit.

The communication unit is configured to receive first indication information and second indication information from a network device.

The communication unit is further configured to receive a first signal from the network device.

The processing unit is configured to process the first signal based on the first indication information and the second indication information.

The first indication information indicates one or more demodulation reference signal DMRS port sets, and the second indication information indicates N first DMRS ports associated with the first signal, where N is greater than or equal to 1.

In addition, for another optional implementation of the communication apparatus in this aspect, refer to related content in the first aspect. Details are not described herein again.

In another implementation, the communication apparatus includes the communication unit and the processing unit.

The communication unit is configured to receive downlink control information DCI from a network device.

The processing unit is configured to determine, based on a quantity of N first demodulation reference signal DMRS ports associated with a first signal and/or a quantity of code division multiplexing CDM groups that do not carry data, whether the DCI includes third indication information.

The communication unit is further configured to receive the first signal from the network device.

The processing unit is further configured to: in response to the DCI including the third indication information, process the first signal based on the third indication information and the N first DMRS ports; or in response to the DCI not including the third indication information, process the first signal based on the N first DMRS ports.

N is greater than or equal to 1. The third indication information indicates one or more second DMRS ports or a CDM group corresponding to one or more second DMRS ports, and the one or more second DMRS ports are different from the N first DMRS ports.

In addition, for another optional implementation of the communication apparatus in this aspect, refer to related content in the third aspect. Details are not described herein again.

In still another implementation, the communication apparatus includes the communication unit and the processing unit.

The communication unit is configured to receive downlink control information DCI.

The processing unit is configured to determine, based on fourth indication information in the DCI, whether the DCI includes third indication information.

The communication unit is further configured to receive a first signal from a network device.

The processing unit is further configured to: in response to the DCI including the third indication information, process the first signal based on the third indication information; or in response to the DCI not including the third indication information, process the first signal based on N first DMRS ports associated with the first signal, where N is greater than or equal to 1.

The DCI includes the fourth indication information. The fourth indication information indicates whether the DCI includes the third indication information. The third indication information indicates one or more second demodulation reference signal DMRS ports or a code division multiplexing CDM group corresponding to one or more second DMRS ports, and the one or more second DMRS ports are different from the N first DMRS ports associated with the first signal.

In addition, for another optional implementation of the communication apparatus in this aspect, refer to related content in the fifth aspect. Details are not described herein again.

In an example, the communication unit is a transceiver or a communication interface, the storage unit is a memory, and the processing unit is a processor.

In an implementation, the communication apparatus includes the transceiver and the processor.

The transceiver is configured to receive first indication information and second indication information from a network device.

The transceiver is further configured to receive a first signal from the network device.

The processor is configured to process the first signal based on the first indication information and the second indication information.

The first indication information indicates one or more demodulation reference signal DMRS port sets, and the second indication information indicates N first DMRS ports associated with the first signal, where N is greater than or equal to 1.

In addition, for another optional implementation of the communication apparatus in this aspect, refer to related content in the first aspect. Details are not described herein again.

In another implementation, the communication apparatus includes the transceiver and the processor.

The transceiver is configured to receive downlink control information DCI from a network device.

The processor is configured to determine, based on a quantity of N first demodulation reference signal DMRS ports associated with a first signal and/or a quantity of code division multiplexing CDM groups that do not carry data, whether the DCI includes third indication information.

The transceiver is further configured to receive the first signal from the network device.

The processor is further configured to: in response to the DCI including the third indication information, process the first signal based on the third indication information and the N first DMRS ports; or in response to the DCI not including the third indication information, process the first signal based on the N first DMRS ports.

N is greater than or equal to 1. The third indication information indicates one or more second DMRS ports or a CDM group corresponding to one or more second DMRS ports, and the one or more second DMRS ports are different from the N first DMRS ports.

In addition, for another optional implementation of the communication apparatus in this aspect, refer to related content in the third aspect. Details are not described herein again.

In another implementation, the communication apparatus including the transceiver and the processor.

The transceiver is configured to receive downlink control information DCI.

The processor is configured to determine, based on fourth indication information in the DCI, whether the DCI includes third indication information.

The transceiver is further configured to receive a first signal from a network device.

The processor is configured to: in response to the DCI including the third indication information, process the first signal based on the third indication information; or in response to the DCI not including the third indication information, process the first signal based on N first DMRS ports associated with the first signal, where N is greater than or equal to 1.

The DCI includes the fourth indication information. The fourth indication information indicates whether the DCI includes the third indication information. The third indication information indicates one or more second demodulation reference signal DMRS ports or a code division multiplexing CDM group corresponding to one or more second DMRS ports, and the one or more second DMRS ports are different from the N first DMRS ports associated with the first signal.

In addition, for another optional implementation of the communication apparatus in this aspect, refer to related content in the fifth aspect. Details are not described herein again.

In an implementation process, the processor is configured to perform, for example, but not limited to, baseband related processing; and the transceiver is configured to perform, for example, but not limited to, radio frequency receiving and sending. The foregoing components is separately disposed on chips that are independent of each other, or at least some or all of the components is disposed on a same chip. For example, the processor is further divided into an analog baseband processor and a digital baseband processor. The analog baseband processor and the transceiver is integrated on a same chip, and the digital baseband processor is disposed on an independent chip. With continuous development of integrated circuit technologies, an increasing quantity of components is integrated onto a same chip. For example, a digital baseband processor and a plurality of application processors (including but not limited to a graphics processor, a multimedia processor, and the like) is integrated onto a same chip. Such a chip is referred to as a system on chip (System on Chip). Whether the components are separately disposed on different chips or integrated and disposed on one or more chips usually depends on a product design. Implementation forms of the foregoing components are not limited in this embodiment described herein.

According to an eighth aspect, at least one embodiment further provides a communication apparatus. The communication apparatus has all or a part of functions of implementing the network device in the method examples according to the second aspect, the fourth aspect, or the sixth aspect. For example, functions of the communication apparatus includes functions of the network device in all or a part of at least one embodiment, or includes functions of separately implementing at least one embodiment. The function is implemented by hardware, or is implemented by hardware executing corresponding software. The hardware or the software includes one or more units or modules corresponding to the functions.

In at least one embodiment, a structure of the communication apparatus includes a processing unit and a communication unit. The processing unit is configured to support the communication apparatus in performing a corresponding function in the foregoing method. The communication unit is configured to support communication between the communication apparatus and another communication apparatus. The communication apparatus further includes a storage unit. The storage unit is configured to be coupled to the processing unit and a sending unit, and the storage unit stores program instructions and data that are necessary for the communication apparatus.

In an implementation, the communication apparatus includes the processing unit and the communication unit.

The processing unit is configured to determine first indication information and second indication information.

The communication unit is configured to send the first indication information and the second indication information to a terminal device.

The communication unit is further configured to send a first signal to the terminal device.

The first indication information indicates one or more demodulation reference signal DMRS port sets, and the second indication information indicates N first DMRS ports associated with the first signal, where N is greater than or equal to 1.

In addition, for another optional implementation of the communication apparatus in this aspect, refer to related content in the second aspect. Details are not described herein again.

In another implementation, the communication apparatus includes the communication unit and the processing unit.

The processing unit is configured to determine downlink control information DCI.

The communication unit is further configured to send the DCI to a terminal device.

The communication unit is further configured to send a first signal to the terminal device.

In response to a quantity of N first DMRS ports associated with the first signal being less than a first preset value, and a quantity of CDM groups that do not carry data not being less than a second preset value, the DCI includes third indication information. The third indication information indicates one or more second DMRS ports or a CDM group corresponding to one or more second DMRS ports, the one or more second DMRS ports are different from the N first DMRS ports, and N is greater than or equal to 1.

In addition, for another optional implementation of the communication apparatus in this aspect, refer to related content in the fourth aspect. Details are not described herein again.

In still another implementation, the communication apparatus includes the communication unit.

The communication unit is configured to send downlink control information DCI to a terminal device.

The communication unit is further configured to send a first signal to the terminal device.

The DCI includes fourth indication information. In response to indicating a first state, the fourth indication information indicates that the DCI includes third indication information. The third indication information indicates one or more second demodulation reference signal DMRS ports or a code division multiplexing CDM group corresponding to one or more second demodulation reference signal DMRS ports, and the one or more second DMRS ports are different from N first DMRS ports associated with the first signal.

In addition, for another optional implementation of the communication apparatus in this aspect, refer to related content in the sixth aspect. Details are not described herein again.

In an example, the processing unit is a processor, the communication unit is a transceiver or a communication interface, and the storage unit is a memory.

In an implementation, the communication apparatus includes the processor and the transceiver.

The processor is configured to determine first indication information and second indication information.

The transceiver is configured to send the first indication information and the second indication information to a terminal device.

The transceiver is further configured to send a first signal to the terminal device.

The first indication information indicates one or more demodulation reference signal DMRS port sets, and the second indication information indicates N first DMRS ports associated with the first signal, where N is greater than or equal to 1.

In addition, for another optional implementation of the communication apparatus in this aspect, refer to related content in the second aspect. Details are not described herein again.

In another implementation, the communication apparatus includes the processor and the transceiver.

The processor is configured to determine downlink control information DCI.

The transceiver is configured to: send the DCI to a terminal device, and send a first signal to the terminal device.

In response to a quantity of N first DMRS ports associated with the first signal being less than a first preset value, and a quantity of CDM groups that do not carry data not being less than a second preset value, the DCI includes third indication information. The third indication information indicates one or more second DMRS ports or a CDM group corresponding to one or more second DMRS ports, the one or more second DMRS ports are different from the N first DMRS ports, and N is greater than or equal to 1.

In addition, for another optional implementation of the communication apparatus in this aspect, refer to related content in the fourth aspect. Details are not described herein again.

In still another implementation, the communication apparatus includes the transceiver.

The transceiver is configured to send downlink control information DCI to a terminal device.

The transceiver is further configured to send a first signal to the terminal device.

The DCI includes fourth indication information. In response to indicating a first state, the fourth indication information indicates that the DCI includes third indication information. The third indication information indicates one or more second demodulation reference signal DMRS ports or a code division multiplexing CDM group corresponding to one or more second demodulation reference signal DMRS ports, and the one or more second DMRS ports are different from N first DMRS ports associated with the first signal.

In addition, for another optional implementation of the communication apparatus in this aspect, refer to related content in the sixth aspect. Details are not described herein again.

According to a ninth aspect, at least one embodiment further provides a processor, configured to perform the foregoing methods. In a process of performing these methods, a process of sending the foregoing information and a process of receiving the foregoing information in the foregoing methods is understood as a process of outputting the foregoing information by the processor and a process of receiving the foregoing input information by the processor. In response to outputting the foregoing information, the processor outputs the foregoing information to a transceiver, so that the transceiver transmits the information. After the foregoing information is output by the processor, other processing is further used before the information arrives at the transceiver. Similarly, in response to the processor receiving the foregoing input information, the transceiver receives the foregoing information, and inputs the foregoing information into the processor. Further, after the transceiver receives the foregoing information, other processing is to be performed on the foregoing information before the information is input into the processor.

Based on the foregoing principle, for example, sending the first indication information and the second indication information mentioned in the foregoing methods is understood as that the processor outputs the first indication information and the second indication information. For another example, receiving the first indication information and the second indication information is understood as that the processor receives the first indication information and the second indication information that are input.

Unless otherwise specified, or in response to operations such as transmitting, sending, and receiving related to the processor not contradicting an actual function or internal logic of the operations in related descriptions, all the operations are more generally understood as operations such as outputting, receiving, and inputting of the processor, instead of operations such as transmitting, sending, and receiving directly performed by a radio frequency circuit and an antenna.

In an implementation process, the processor is a processor specially configured to perform these methods, or a processor, for example, a general-purpose processor, that executes computer instructions in a memory to perform these methods. The memory is a non-transitory (non-transitory) memory, for example, a read-only memory (Read-Only Memory, ROM). The memory and the processor is integrated on a same chip, or is separately disposed on different chips. A type of the memory and a manner of disposing the memory and the processor are not limited in this embodiment described herein.

According to a tenth aspect, at least one embodiment further provides a communication system. The system includes at least one terminal device and at least one network device in the foregoing aspects. In at least one embodiment, the system further includes another device that interacts with the terminal device or the network device in the solutions provided in at least one embodiment.

According to an eleventh aspect, at least one embodiment provides a computer-readable storage medium, configured to store computer software instructions. In response to the instructions being executed by a communication apparatus, the method according to the first aspect is implemented.

According to a twelfth aspect, at least one embodiment provides a computer-readable storage medium, configured to store computer software instructions. In response to the instructions being executed by a communication apparatus, the method according to the second aspect is implemented.

According to a thirteenth aspect, at least one embodiment provides a computer-readable storage medium, configured to store computer software instructions. In response to the instructions being executed by a communication apparatus, the method according to the third aspect is implemented.

According to a fourteenth aspect, at least one embodiment provides a computer-readable storage medium, configured to store computer software instructions. In response to the instructions being executed by a communication apparatus, the method according to the fourth aspect is implemented.

According to a fifteenth aspect, at least one embodiment provides a computer-readable storage medium, configured to store computer software instructions. In response to the instructions being executed by a communication apparatus, the method according to the fifth aspect is implemented.

According to a sixteenth aspect, at least one embodiment provides a computer-readable storage medium, configured to store computer software instructions. In response to the instructions being executed by a communication apparatus, the method according to the sixth aspect is implemented.

According to a seventeenth aspect, at least one embodiment further provides a computer program product including instructions. In response to the computer program product running on a communication apparatus, the communication apparatus performs the method according to the first aspect.

According to an eighteenth aspect, at least one embodiment further provides a computer program product including instructions. In response to the computer program product running on a communication apparatus, the communication apparatus performs the method according to the second aspect.

According to a nineteenth aspect, at least one embodiment further provides a computer program product including instructions. In response to the computer program product running on a communication apparatus, the communication apparatus performs the method according to the third aspect.

According to a twentieth aspect, at least one embodiment further provides a computer program product including instructions. In response to the computer program product running on a communication apparatus, the communication apparatus performs the method according to the fourth aspect.

According to a twenty-first aspect, at least one embodiment further provides a computer program product including instructions. In response to the computer program product running on a communication apparatus, the communication apparatus performs the method according to the fifth aspect.

According to a twenty-second aspect, at least one embodiment further provides a computer program product including instructions. In response to the computer program product running on a communication apparatus, the communication apparatus performs the method according to the sixth aspect.

According to a twenty-third aspect, at least one embodiment provides a chip system. The chip system includes a processor and an interface. The interface is configured to obtain a program or instructions. The processor is configured to invoke the program or the instructions to implement or support a terminal in implementing functions in the first aspect to the sixth aspect, for example, determining or processing at least one of data and information in the foregoing methods. In at least one embodiment, the chip system further includes a memory. The memory is configured to store program instructions and data that are necessary for the terminal. The chip system includes a chip, or includes a chip and another discrete component.

DESCRIPTION OF EMBODIMENTS

The following clearly describes at least one embodiment with reference to the accompanying drawings.

To better understand a signal transmission method disclosed in at least one embodiment provides, a communication system to which at least one embodiment are applicable is first described.

The technical solutions in at least one embodiment provides is applied to various communication systems, for example, a global mobile communication system, a long term evolution (Long Term Evolution, LTE) frequency division duplex system, an LTE time division duplex system, a universal mobile telecommunications system, and a 4th generation (4th Generation, 4G) mobile communication technology system. With continuous development of communication technologies, the technical solutions in at least one embodiment provides is further applied to a subsequent evolved communication system, for example, a 5th generation (5th Generation, 5G) mobile communication technology system.

Figure 1:
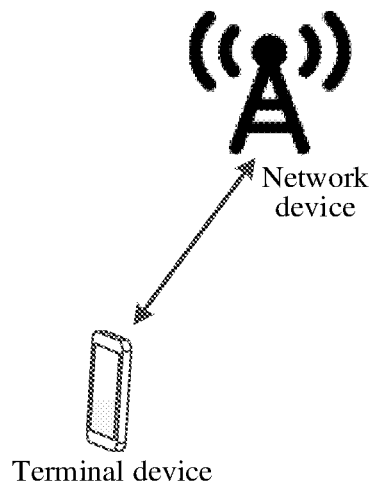
FIG. 1 is a schematic diagram of a structure of a communication system according to at least one embodiment.

FIG. 1 is a schematic diagram of a structure of a communication system according to at least one embodiment. The communication system includes but is not limited to one network device and one terminal device. Quantities and forms of devices shown in FIG. 1 are used as examples and do not constitute a limitation on at least one embodiment. During actual application, two or more network devices and two or more terminal devices is included. The communication system shown in FIG. 1 is described by using an example in which there is one network device and one terminal device, and the network device provides a service for the terminal device. In FIG. 1, an example in which the network device is a base station and the terminal device is a mobile phone is used.

In at least one embodiment, the network device is a device that has a wireless transceiver function or a chip that is disposed in the device. The network device includes but is not limited to an evolved NodeB (evolved NodeB, eNB), a radio network controller (radio network controller, RNC), a NodeB (NodeB, NB), a network device controller (base station controller, BSC), a network device transceiver station (base transceiver station, BTS), a home network device (for example, a home evolved NodeB or a home NodeB, HNB), a baseband unit (baseband unit, BBU), an access point (access point, AP) in a wireless fidelity (wireless fidelity, Wi-Fi) system, a wireless relay node, a wireless backhaul node, a transmission point (transmission reception point, TRP, or transmission point, TP), or the like. The network device is alternatively a device used in a 4G, 5G, or even 6G system, for example, a gNB in an NR system, a transmission point (TRP or TP), or one or a group of (including a plurality of antenna panels) antenna panels of a network device in the 4G system. The network device is alternatively a network node that forms a gNB or a transmission point, for example, a baseband unit (BBU), a distributed unit (distributed unit, DU), a pico network device (Picocell), a femto network device (Femtocell), or a road side unit (road side unit, RSU) in an intelligent driving scenario.

In at least one embodiment, the terminal device is also referred to as user equipment (user equipment, UE), a terminal, an access terminal, a subscriber unit, a subscriber station, a mobile station, a mobile console, a remote station, a remote terminal, a mobile device, a user terminal, a user agent, or a user apparatus, and is applied to a 4G, 5G, or even 6G system. The terminal device in at least one embodiment provides is a mobile phone (mobile phone), a tablet computer (Pad), a computer having a wireless transceiver function, a virtual reality (virtual reality, VR) terminal, an augmented reality (augmented reality, AR) terminal, a wireless terminal in industrial control (industrial control), a wireless terminal in self driving (self driving), a wireless terminal in telemedicine (telemedicine), a wireless terminal in a smart grid (smart grid), a wireless terminal in transportation safety (transportation safety), a wireless terminal in a smart city (smart city), a wireless terminal in a smart home (smart home), an RSU of the foregoing wireless terminal type, or the like.

For ease of understanding of at least one embodiment, the following two points are described.

(1) In at least one embodiment, an NR network scenario in a wireless communication network is used as an example of scenarios for description. The solutions in at least one embodiment is further applied to another wireless communication network, and a corresponding name is also replaced with a name of a corresponding function in the another wireless communication network.

(2) Aspects, embodiments, or features are presented in at least one embodiment by describing a system that includes a plurality of devices, components, modules, and the like. A system includes another device, component, module, and the like, and/or does not include all devices, components, modules, and the like discussed with reference to the accompanying drawings. In addition, a combination of these solutions is used.

Related concepts in at least one embodiment provides are then briefly described.

1. First Signal, DMRS Port, First DMRS Port, and Second DMRS Port

The first signal is a downlink signal received by a terminal device from a network device, or is understood as a wanted signal received by the terminal device from the network device. A demodulation reference signal (Demodulation Reference Signal, DMRS) is a reference signal for demodulating an uplink signal or a downlink signal. The DMRS port is a port associated with the DMRS.

For ease of description, a DMRS port associated with the first signal is referred to as the first DMRS port. In other words, a DMRS port associated with the downlink signal is referred to as the first DMRS port. A DMRS port associated with an interfering signal received by the terminal device in response to the terminal device receiving the first signal is referred to as the second DMRS port. In other words, the DMRS port associated with the interfering signal is referred to as the second DMRS port. Alternatively, the second DMRS port is referred to as a DMRS port with strong interference, or the second DMRS port is referred to as a DMRS port with potential interference, or is referred to as a DMRS port corresponding to a signal of potential joint scheduled UE.

2. CDM Group

Figure 2:
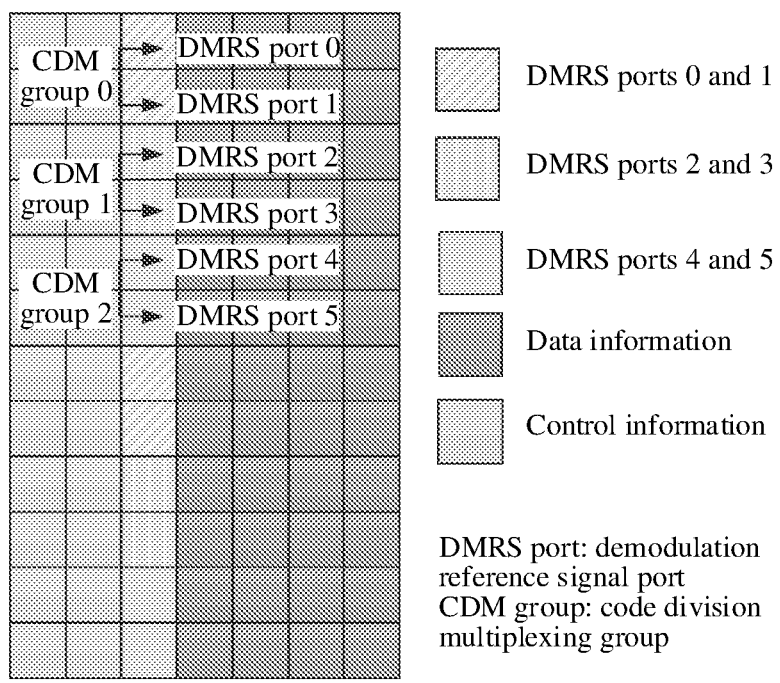
FIG. 2 is a schematic diagram of a structure of a CDM group according to at least one embodiment.

In a multiple-input multiple-output (multiple-input multiple-output, MIMO) technology, DMRSs corresponding to different antenna ports is multiplexed in a manner such as time division, frequency division, and code division. For example, as shown in FIG. 2, a horizontal direction represents time domain, a vertical direction represents frequency domain, and each small block represents a resource element (Resource Element, RE). DMRS port 0 and DMRS port 1 are multiplexed by using an orthogonal code. Therefore, REs corresponding to DMRS port 0 and DMRS port 1 are also referred to as a code division multiplexing (Code Division Multiplexing, CDM) group, namely, CDM group 0. In addition, DMRS port 2 and DMRS port 3 are CDM group 1, and DMRS port 4 and DMRS port 5 are CDM group 2.

3. First Indication Information, Second Indication Information, and Third Indication Information The first indication information indicates one or more demodulation reference signal DMRS port sets. The second indication information indicates N first DMRS ports associated with the first signal, or the second indication information indicates N first DMRS ports and a quantity of CDM groups that do not carry data, where N is greater than or equal to 1. The third indication information indicates one or more second DMRS ports or a CDM group corresponding to one or more second DMRS ports. Fourth indication information indicates whether downlink control information DCI further includes the third indication information. In response to the fourth indication information indicating a first state, the DCI includes the third indication information. In response to the fourth indication information indicating a second state, indicates that the DCI does not include the third indication information.

Naming of the foregoing information is not limited in at least one embodiment provides. For example, the first indication information is also referred to as DMRS port set information, and the second indication information is also referred to as first DMRS port information.

Further, a technical problem to be resolved in at least one embodiment provides is briefly described.

Figure 3A:
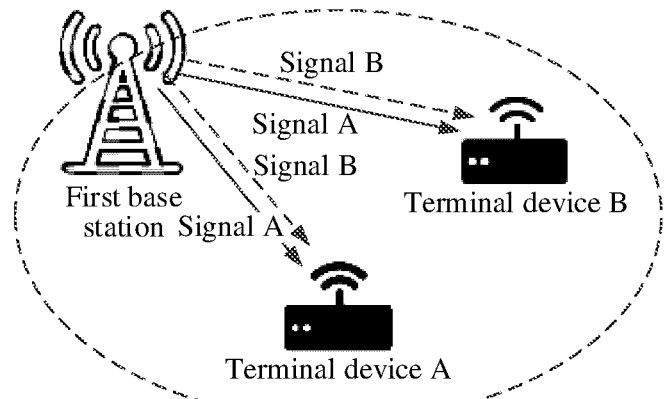
FIG. 3a is a schematic diagram of a communication scenario according to at least one embodiment.

In some communication scenarios, in response to receiving a downlink signal from a network device, a terminal is interfered with by another signal. For example, in scenario 1 shown in FIG. 3a, in response to sending signal A to terminal device A on time-frequency resource A, a first base station also sends signal B to terminal device B on time-frequency resource A. Because the first base station sends signal A and signal B on a same time-frequency resource, in response to receiving signal A, terminal device A also receives signal B. In this case, signal B causes interference to receiving signal A by terminal device A. Therefore, signal B is an interfering signal for terminal device A. Similarly, signal A is an interfering signal for terminal device B.

Figure 3B:
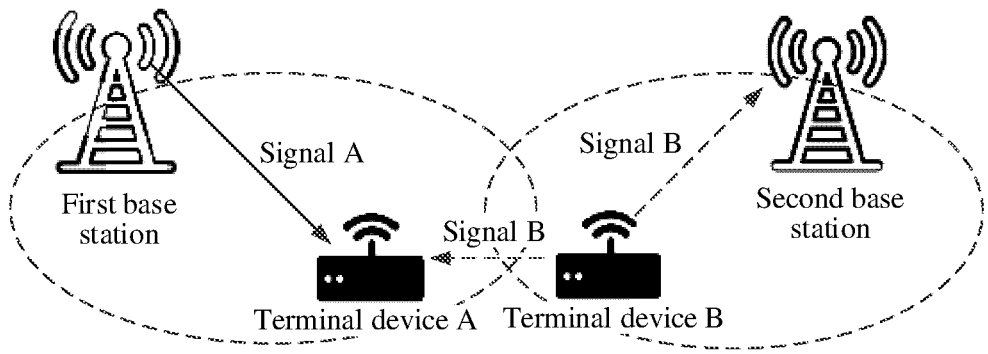
FIG. 3b is a schematic diagram of another communication scenario according to at least one embodiment.

For another example, in communication scenario 2 shown in FIG. 3b, in response to a first base station sending signal A to terminal device A on time-frequency resource A, a second base station in neighboring cell A also receives signal B from terminal device B on time-frequency resource A. Therefore, in response to receiving signal A, terminal device A also receives signal B from terminal device B. Therefore, signal B is an interfering signal for terminal device A.

Figure 3C:
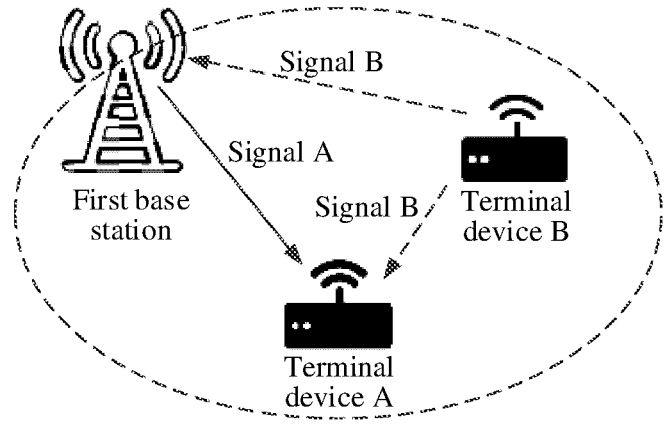
FIG. 3c is a schematic diagram of still another communication scenario according to at least one embodiment.

For another example, in communication scenario 3 shown in FIG. 3c, a first base station is a full-duplex base station, that is, the first base station simultaneously sends and receives a signal on a same frequency domain resource. In response to the first base station sending signal A to terminal device A, in response to terminal device B is sending signal B to the first base station, terminal device A receives, in response to receiving signal A, signal B sent by terminal device B. Therefore, signal B is an interfering signal for terminal device A.

In such communication scenarios, in response to receiving a wanted signal, a terminal device is to suppress interference caused by an interfering signal to the wanted signal. To suppress impact of the interfering signal on the wanted signal, the terminal device learns of a DMRS port with strong interference. In this way, the terminal device demodulates a signal that is from a network device based on the DMRS port with strong interference, to suppress the interfering signal. Currently, the network device notifies, by using downlink control information (Downlink Control Information, DCI), each terminal device of the DMRS port with strong interference. Consequently, signaling overheads are high.

Therefore, how the network device notifies the terminal device of the DMRS port with strong interference is a problem that is to be urgently resolved currently.

Embodiments described herein provide a signal transmission method 100 to a signal transmission method 300. In the signal transmission method 100, a network device sends, to a terminal device, first indication information indicating one or more DMRS port sets and N first DMRS ports associated with a first signal. This helps the terminal device demodulate the first signal that is from the network device based on the first indication information and second indication information, to suppress an interfering signal. In addition, a manner in which the network device sends the first indication information indicating the one or more DMRS port sets helps reduce signaling overheads.

In the signal transmission method 200, in response to a quantity of N first DMRS ports associated with a first signal being less than a first preset value, and a quantity of CDM groups that do not carry data not being less than a second preset value, DCI sent by a network device to a terminal device includes third indication information. This helps the terminal device directly process the first signal that is from the network device based on the third indication information, to reduce processing complexity for the terminal device. In response to the quantity of N first DMRS ports associated with the first signal not being less than the first preset value, or the quantity of CDM groups that do not carry data is less than the second preset value, the DCI sent by the network device to the terminal device does not include the third indication information. This helps reduce signaling overheads of the network device. In addition, the terminal device alternatively demodulates the first signal based on the first DMRS port and the quantity of CDM groups that do not carry data, to suppress an interfering signal.

In the signal transmission method 300, a network device indicates, based on fourth indication information indicating a state, whether DCI includes third indication information. Compared with the manner in the signal transmission method 200 in which whether the DCI includes the third indication information is determined based on the quantity of N first DMRS ports associated with the first signal and the quantity of CDM groups that do not carry data, this manner helps reduce signaling overheads of the network device.

The following describes at least one embodiment and related implementations with reference to the accompanying drawings.

Figure 4:
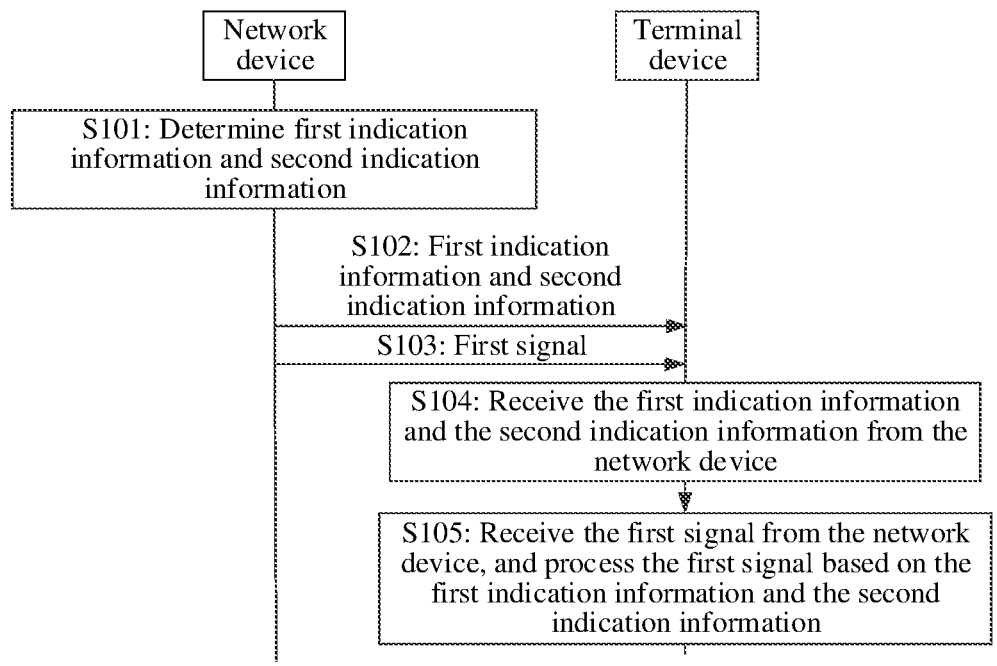
FIG. 4 is a schematic flowchart of a signal transmission method according to at least one embodiment.

FIG. 4 is a schematic flowchart of a signal transmission method 100 according to at least one embodiment. The signal transmission method 100 is described from a perspective of interaction between a terminal device and a network device. The signal transmission method 100 includes but is not limited to the following steps.

S101: The network device determines first indication information and second indication information.

The first indication information indicates one or more DMRS port sets. Each of the one or more DMRS port sets includes one or more DMRS ports. The DMRS port included in the one or more DMRS port sets is a subset of all DMRS ports configured by the network device for the terminal device. In other words, the DMRS ports indicated by the first indication information are all or a part of DMRS ports configured by the network device.

The second indication information indicates N first DMRS ports associated with a first signal, and the first signal is a wanted signal received by each terminal device.

Figure 5:
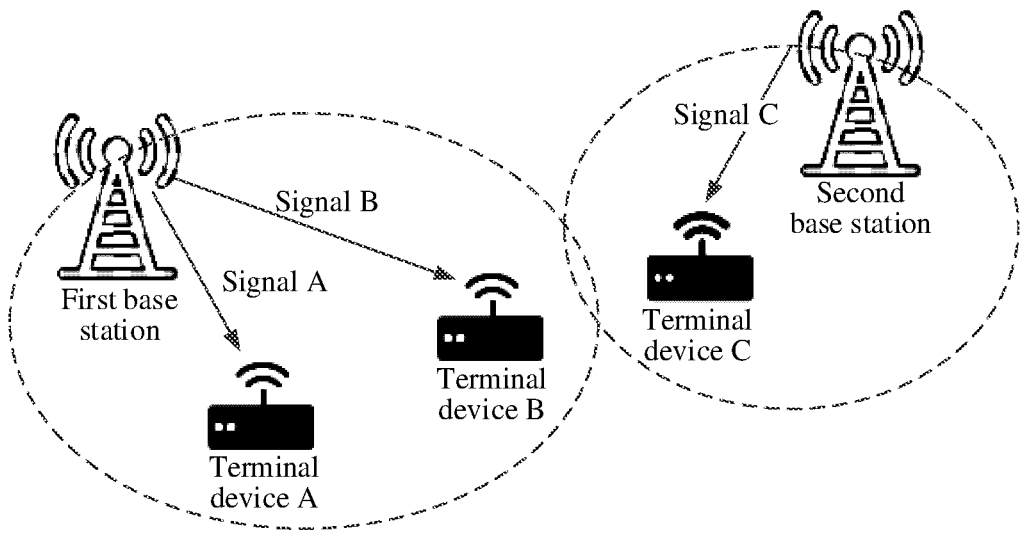
FIG. 5 is a schematic diagram of still another communication scenario according to at least one embodiment.

For example, as shown in FIG. 5, terminal device A and terminal device B are in a same cell, and terminal device C is in a neighboring cell close to terminal device B. In response to a first base station sending signal A to terminal device A on time-frequency resource A, the first base station also sends signal B to terminal device B on time-frequency resource A. A second base station also sends signal C to terminal device C on time-frequency resource A. Signal A is a first signal of terminal device A, signal B is a first signal of terminal device B, and signal C is a first signal of terminal device C. Therefore, for terminal device A, first DMRS ports associated with signal A are DMRS port 0 and DMRS port 1, and second indication information determined by the network device for terminal device A indicates DMRS port 0 and DMRS port 1. For terminal device B, first DMRS ports associated with signal B are DMRS port 2 and DMRS port 3, and second indication information determined by the network device for terminal device B indicates DMRS port 2 and DMRS port 3. For terminal device C, first DMRS ports associated with signal C are DMRS port 4 and DMRS port 5, and second indication information determined by the network device for terminal device C indicates DMRS port 4 and DMRS port 5. The second indication information is determined by the network device based on different terminal devices.

In an implementation, the network device randomly divides a plurality of DMRS ports configured for the terminal device into a plurality of DMRS port sets, and then indicates one or more of the plurality of DMRS port sets by using an index. In other words, the first indication information is represented by using the index.

For example, the network device configures four DMRS ports for the terminal device, which are DMRS port 0, DMRS port 1, DMRS port 2, and DMRS port 4 respectively. The four DMRS ports are divided into a first DMRS port set and a second DMRS port set. In a manner, the first DMRS port set includes one DMRS port, and the second DMRS port set includes three DMRS ports. In response to there being no intersection set between the DMRS port in the first DMRS port set and the DMRS ports in the second DMRS port set, there are four methods of division for the DMRS port sets. In response to there being an intersection set between the DMRS port in the first DMRS port set and the DMRS ports in the second DMRS port set, there are 16 methods of division. In another manner, both the first DMRS port set and the second DMRS port set include two DMRS port sets. In response to there being no intersection set between the DMRS ports in the first DMRS port set and the DMRS ports in the second DMRS port set, there are six methods of division for the DMRS port sets. In response to there being an intersection set between the DMRS ports in the first DMRS port set and the DMRS ports in the second DMRS port set, there are 36 methods of division. Therefore, In response to the network device dividing the four DMRS ports into the first DMRS port set and the second DMRS port set, there are 62 methods of division in total. The network device indicates one DMRS port set combination by using six bits, that is, indicate two DMRS port sets in the plurality of DMRS port sets. In response to the network device determining that the one or more DMRS port sets indicated by the first indication information are DMRS port set 0 and DMRS port set 3 in Table 1, the network device determines that an index is 000010, that is, the first indication information is 000010.

TABLE 1

| Index | DMRS port set |
|---|---|
| 000000 | DMRS port set 0 and DMRS port set 1 |
| 000001 | DMRS port set 0 and DMRS port set 2 |
| 000010 | DMRS port set 0 and DMRS port set 3 |
| ... | ... |
| 111111 | DMRS port set 61 and DMRS port set 62 |

S102: The network device sends the first indication information and the second indication information to the terminal device.

S103: The network device sends the first signal to the terminal device.

S104: The terminal device receives the first indication information and the second indication information from the network device.

S105: The terminal device receives the first signal from the network device, and processes the first signal based on the first indication information and the second indication information.

Herein, that the terminal device receives the first signal is understood as that the terminal device obtains the first signal from the network device, and does not include processing of the first signal. In other words, the receiving of the first signal herein is understood as receiving in a narrow sense. That the terminal device processes the first signal based on the first indication information and the second indication information is understood as that the terminal device demodulates the first signal based on the first indication information and the second indication information, and does not include receiving of the first signal. In other words, the processing of the first signal herein is alternatively understood as processing in a narrow sense. In response to that the terminal device receiving the first signal is understood as receiving in a broad sense, that is, includes the processing of the first signal, S105 includes: The terminal device receives the first signal from the network device based on the first indication information and the second indication information. Alternatively, in response to that the terminal device processing the first signal based on the first indication information and the second indication information being understood as processing in a broad sense, that is, includes the receiving of the first signal, S105 is described as: The terminal device processes the first signal that is from the network device based on the first indication information and the second indication information.

In at least one embodiment, the terminal device demodulates the first signal that is from the network device based on the first indication information and the second indication information that indicates the N first DMRS ports associated with the first signal, to suppress an interfering signal. In addition, compared with indicating a DMRS port that is with strong interference and that corresponds to each terminal device, that the first indication information sent by the network device indicates the one or more DMRS port sets helps reduce signaling overheads of the network device. Therefore, in at least one embodiment, the interfering signal is suppressed, and the signaling overheads needed for the network device to notify the terminal device of the DMRS port with strong interference is reduced.

In an implementation, signals associated with DMRS ports in each DMRS port set are correlated. Therefore, that the terminal device processes the first signal based on the first indication information and the second indication information includes: The terminal device determines one or more second DMRS ports based on the correlation between the signals associated with the DMRS ports in each DMRS port set and the N first DMRS ports that are associated with the first signal and that are indicated by the second indication information. In this way, the terminal device obtains a first channel coefficient through estimation based on a DMRS corresponding to the N first DMRS ports, and obtains a second channel coefficient through estimation based on a DMRS corresponding to the one or more second DMRS ports. Then, the terminal device processes the first signal based on the first channel coefficient and the second channel coefficient. The processing is understood as demodulating the first signal.

In an implementation, the signals associated with the DMRS ports in each DMRS port set are strongly correlated. Alternatively, the signals associated with the DMRS ports in each DMRS port set are mutual strong interfering signals. The strong correlation between the signals is understood as strong interference between the signals. In other words, the network device indicates the one or more DMRS port sets based on the strong correlation between the signals associated with the DMRS ports, or based on a relationship that the signals associated with the DMRS ports are mutual strong interfering signals.

The signals associated with the DMRS ports in each DMRS port set are strongly correlated is relative to correlation between signals associated with DMRS ports between DMRS port sets. That is, correlation between the signals associated with the DMRS ports in the DMRS port set is stronger than the correlation between the signals associated with the DMRS ports between the DMRS port sets. Alternatively, that the signals associated with the DMRS ports in each DMRS port set are mutual strong interfering signals is relative to correlation between signals associated with DMRS ports between DMRS port sets. That is, strength of interference between the signals associated with the DMRS ports in the DMRS port set is stronger than strength of interference between the signals associated with the DMRS ports between the DMRS port sets. Therefore, in response to receiving the first indication information, the terminal device considers interference to the first signal caused by another DMRS port in a DMRS port set including the first DMRS port, and does not consider interference to the first signal caused by a DMRS port in another DMRS port set.

Alternatively, the terminal device first considers interference to the first signal caused by another DMRS port in a DMRS port set including the first DMRS port, and then considers interference to the first signal caused by a DMRS port in another DMRS port set. That is, for the DMRS port set including the first DMRS port, all DMRS ports other than the first DMRS port in the DMRS port set are the DMRS ports with strong interference. This manner helps the terminal device determine, in response to receiving the first indication information, the one or more second DMRS ports in the DMRS port set including the first DMRS port. In addition, the signals that are associated with the DMRS ports in each DMRS port set and that are mutual strong interfering signals is alternatively described as signals with mutual potential strong interference, signals with mutual potential interference, or signals corresponding to a joint scheduled DMRS port.

Therefore, in step S104, that the terminal device processes the first signal based on the first indication information includes: S1041: The terminal device determines the one or more second DMRS ports based on the first indication information and the second indication information, where the one or more second DMRS ports and the N first DMRS ports belong to a same DMRS port set. S1042: The terminal device demodulates the first signal based on the DMRS corresponding to the N first DMRS ports and the DMRS corresponding to the one or more second DMRS ports. Specifically, the terminal device determines a DMRS port other than the first DMRS port in the DMRS port set including the first DMRS port as the one or more second DMRS ports. Then, the terminal device obtains first channel information through estimation based on the DMRS corresponding to the N first DMRS ports, and obtains second channel information through estimation based on the DMRS corresponding to the one or more second DMRS ports. The terminal device demodulates the first signal based on the first channel information and the second channel information. Because the second channel information is channel information obtained based on the DMRS corresponding to the one or more second DMRS ports, and the second DMRS port is the DMRS port with strong interference, the interfering signal is suppressed in this manner.

Figure 6A:
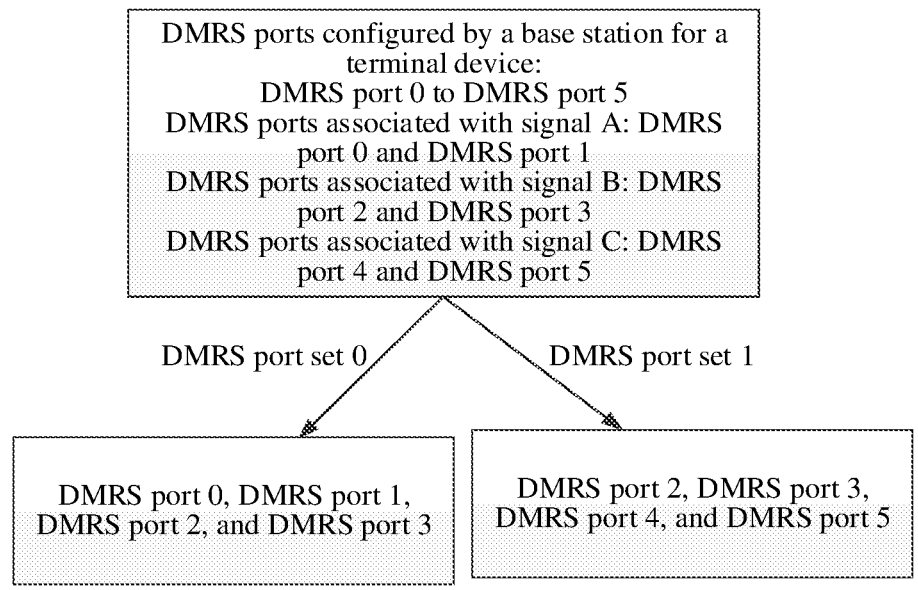
FIG. 6a is a schematic diagram of indicating a DMRS port set according to at least one embodiment.

For example, a communication scenario of terminal device A, terminal device B, and terminal device C is shown in FIG. 5, and a DMRS port set that is indicated by the first indication information determined by the network device is shown in FIG. 6a. The first base station configures six DMRS ports for terminal device A, terminal device B, and terminal device C, including DMRS port 0 to DMRS port 5. In addition, DMRS ports associated with signal A are DMRS port 0 and DMRS port 1, DMRS ports associated with signal B are DMRS port 2 and DMRS port 3, and DMRS ports associated with signal C are DMRS port 4 and DMRS port 5. Signal B is an interfering signal in response to terminal device A receiving signal A, signal A and signal C are interfering signals in response to terminal device B receiving signal C, and signal B is also an interfering signal in response to terminal device C receiving signal C. Therefore, the first base station indicates, based on strong correlation between the signals in the DMRS port set, that two DMRS port sets indicated by using the first indication information are DMRS port set 0 and DMRS port set 1. DMRS port set 0 includes DMRS port 0, DMRS port 1, DMRS port 2, and DMRS port 3. DMRS port set 1 includes DMRS port 2, DMRS port 3, DMRS port 4, and DMRS port 5. In DMRS port set 0, signal A associated with DMRS port 0 and DMRS port 1 and signal B associated with DMRS port 2 and DMRS port 3 are strongly correlated. The strong correlation means that signal A and signal B are mutual interfering signals. In DMRS port set 1, signal B associated with DMRS port 2 and DMRS port 3 and signal C associated with DMRS port 4 and DMRS port 5 are also strongly correlated.

The first DMRS port is a DMRS port associated with a wanted signal received by the terminal device. Therefore, for terminal device A, first DMRS ports are DMRS port 0 and DMRS port 1, and DMRS port 0 and DMRS port 1 are in DMRS port set 0. Because the signals associated with the DMRS ports in DMRS port set 0 are strongly correlated, DMRS port 2 and DMRS port 3 in DMRS port set 0 are second DMRS ports of terminal device A, in other words, DMRS port 2 and DMRS port 3 are DMRS ports with strong interference of terminal device A. For terminal device B, first DMRS ports are DMRS port 2 and DMRS port 3, and DMRS port 2 and DMRS port 3 are in DMRS port set 0 and DMRS port set 1. Similarly, DMRS port 0 and DMRS port 1 in DMRS port set 0 and DMRS port 4 and DMRS port 5 in DMRS port set 1 are second DMRS ports of terminal device B, in other words, DMRS port 0, DMRS port 1, DMRS port 4, and DMRS port 5 are DMRS ports with strong interference of terminal device B. For terminal device C, first DMRS ports are DMRS port 4 and DMRS port 5, and DMRS port 4 and DMRS port 5 are in DMRS port set 1. Similarly, DMRS port 2 and DMRS port 3 in the DMRS port set are second DMRS ports of terminal device C, in other words, DMRS port 2 and DMRS port 3 are also DMRS ports with strong interference of terminal device C. In response to the network device indicating the one or more DMRS port sets based on the strong correlation between the signals associated with the DMRS ports in the DMRS port set, or based on the relationship that the signals associated with the DMRS ports in the DMRS port set being mutual strong interfering signals, the first DMRS port and the second DMRS port belong to a same indicated DMRS port set.

In another implementation, the signals associated with the DMRS ports in each DMRS port set are weakly correlated. Alternatively, the signals associated with the DMRS ports in each DMRS port set do not interfere with each other. In other words, the network device indicates the one or more DMRS port sets based on the weak correlation between the signals associated with the DMRS ports, or based on a relationship that the signals associated with the DMRS ports do not interfere with each other.

The signals associated with the DMRS ports in each DMRS port set are weakly correlated is relative to correlation between signals associated with DMRS ports between DMRS port sets. That is, correlation between the signals associated with the DMRS ports in the DMRS port set is weaker than the correlation between the signals associated with the DMRS ports between the DMRS port sets. Alternatively, that the signals associated with the DMRS ports in each DMRS port set do not interfere with each other is relative to correlation between signals associated with DMRS ports between sets. That is, strength of interference between the signals associated with the DMRS ports in the DMRS port set is weaker than strength of interference between the signals associated with the DMRS ports between the DMRS port sets. Therefore, in response to receiving the first indication information, the terminal device considers interference caused by a DMRS port in a DMRS port set not including the first DMRS port to the first signal, and does not consider interference caused by another DMRS port in a DMRS port set including the first DMRS port to the first signal. Alternatively, the terminal device first considers interference caused by a DMRS port in a DMRS port set not including the first DMRS port to the first signal, and then considers interference caused by another DMRS port in a DMRS port set including the first DMRS port to the first signal. That is, for the DMRS port set including the first DMRS port, a DMRS port other than the first DMRS port in the DMRS port set is not the DMRS port with strong interference, and a DMRS port in the DMRS port set not including the first DMRS port is the DMRS port with strong interference. This manner helps the terminal device determine, in response to receiving the first indication information, the one or more second DMRS ports based on the DMRS port set not including the first DMRS port. In addition, the signals that are associated with the DMRS ports in each DMRS port set and that do not interfere with each other is alternatively described as signals without mutual potential strong interference, signals without mutual potential interference, or signals not corresponding to a joint scheduled DMRS port.

Therefore, in step S104, that the terminal device processes the first signal based on the first indication information includes: S1041: The terminal device determines the one or more second DMRS ports based on the first indication information and the second indication information, where the one or more second DMRS ports and the N first DMRS ports do not belong to a same DMRS port set. S1042: The terminal device demodulates the first signal based on the DMRS corresponding to the N first DMRS ports and the DMRS corresponding to the one or more second DMRS ports. Specifically, the terminal device determines a DMRS port in the DMRS port set not including the first DMRS port as the one or more second DMRS ports. Then, the terminal device obtains first channel information through estimation based on the DMRS corresponding to the N first DMRS ports, and obtains second channel information through estimation based on the DMRS corresponding to the one or more second DMRS ports. The terminal device demodulates the first signal based on the first channel information and the second channel information. Because the second channel information is channel information obtained based on the DMRS corresponding to the one or more second DMRS ports, and the second DMRS port is the DMRS port with strong interference, the interfering signal is also suppressed in this manner.

Figure 6B:
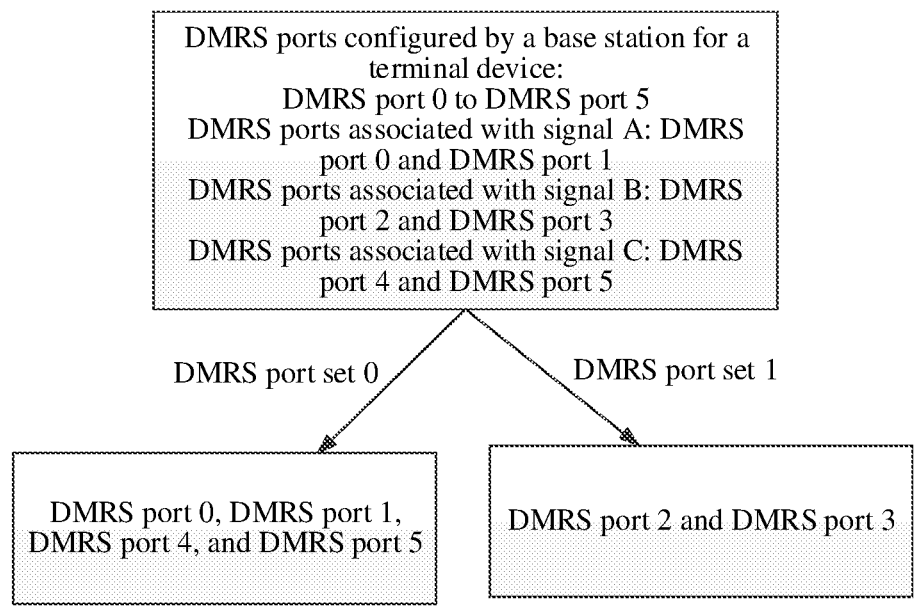
FIG. 6b is another schematic diagram of indicating a DMRS port set according to at least one embodiment.

For example, a communication scenario between the first base station, the second base station, terminal device A, terminal device B, and terminal device C is also shown in FIG. 5, and a DMRS port set that is indicated by the first indication information determined by the network device is shown in FIG. 6b. The first base station configures six DMRS ports for terminal device A, terminal device B, and terminal device C, including DMRS port 0 to DMRS port 5. In addition, DMRS ports associated with signal A are DMRS port 0 and DMRS port 1, DMRS ports associated with signal B are DMRS port 2 and DMRS port 3, and DMRS ports associated with signal C are DMRS port 4 and DMRS port 5. Signal A and signal C do not interfere with each other. Therefore, the first base station indicates, based on weak correlation between the signals in the DMRS port set, or based on that the signals do not interfere with each other, that two DMRS port sets indicated by using the first indication information are DMRS port set 0 and DMRS port set 1. DMRS port set 0 includes DMRS port 0, DMRS port 1, DMRS port 4, and DMRS port 5. DMRS port set 1 includes DMRS port 2 and DMRS port 3. In DMRS port set 0, signal A associated with DMRS port 0 and DMRS port 1 and signal C associated with DMRS port 4 and DMRS port 5 are weakly correlated. The weak correlation means that signal A and signal C do not interfere with each other. A signal associated with DMRS port 2 and DMRS port 3 in DMRS port set 1 is signal B.

For terminal device A, first DMRS ports are DMRS port 0 and DMRS port 1, and DMRS port 0 and DMRS port 1 are in DMRS port set 0. Because the signals associated with the DMRS ports in DMRS port set 0 are weakly correlated, in other words, the signals associated with the DMRS ports in DMRS port set 0 do not interfere with each other, the terminal device determines DMRS port 2 and DMRS port 3 in DMRS port set 1 not including DMRS port 0 and DMRS port 1 as second DMRS ports of terminal device A. For terminal device B, first DMRS ports are DMRS port 2 and DMRS port 3, and DMRS port 2 and DMRS port 3 are in DMRS port set 1. Similarly, the terminal device determines DMRS port 0, DMRS port 1, DMRS port 4, and DMRS port 5 in DMRS port set 0 as second DMRS ports of terminal device B. For terminal device C, first DMRS ports are DMRS port 4 and DMRS port 5, and the DMRS port 4t and the DMRS port 5 are in DMRS port set 0. Similarly, the terminal device determines DMRS port 2 and DMRS port 3 in DMRS port set 1 as second DMRS ports of terminal device C. In response to the network device indicates the one or more DMRS port sets based on the weak correlation between the signals associated with the DMRS ports in the DMRS port set, or based on the relationship that the signals associated with the DMRS ports in the DMRS port set do not interfere with each other, the first DMRS port and the second DMRS port do not belong to a same indicated DMRS port set.

In an implementation, the first indication information sent by the network device is carried in group common downlink control information (Downlink Control Information, DCI), and the group common DCI is scrambled by using a dedicated radio network temporary identifier (Radio Network Temporary Identifier, RNTI). The network device multicasts the first indication information to a plurality of terminal devices by using the group common DCI, so that the plurality of terminal devices each obtain one or more same DMRS port sets. For example, in FIG. 5, after determining the first indication information, the first base station multicasts the first indication information to terminal device A, terminal device B, and terminal device C by using the group common DCI, instead of separately sending the first indication information to each terminal device. In this manner, in response to signaling overheads of the network device are reduced, one or more terminal devices learn of the first indication information indicating the one or more DMRS port sets.

Further, before receiving the group common DCI that carries the first indication information, the terminal device learns of, in advance, a value of the dedicated RNTI for scrambling the group common DCI or a parameter for determining the value of the dedicated RNTI. In an implementation, the value of the dedicated RNTI or the parameter for determining the value of the dedicated RNTI is notified by the network device to the terminal device in advance by using other signaling, for example, RRC signaling or MAC layer signaling.

In another implementation, the value of the dedicated RNTI or the parameter for determining the value of the dedicated RNTI includes at least a first part and a second part, and the terminal device determines the value of the dedicated RNTI or the parameter for determining the value of the dedicated RNTI by using the first part and the second part. The first part is notified by the network device to the terminal device in advance by using other signaling, for example, RRC signaling or MAC layer signaling. The second part is carried by DCI carrying the second indication information. For example, the second part is explicitly carried in a field in the DCI carrying the second indication information, or the second part is implicitly carried in information such as resource location information of a control channel carrying the DCI or a number of a control channel element (Control Channel Element, CCE). In this implementation, that the terminal device receives the first indication information and the second indication information from the network device in S104 includes the following steps.

S1041: The terminal device receives the second indication information from the network device.

S1042: The terminal device determines, based on the DCI carrying the second indication information, or fifth indication information in the DCI, a scrambling identifier for receiving DCI carrying the first indication information, where the fifth indication information carries a resource location of the control channel of the DCI or the number of the control channel element.

S1043: The terminal device receives the first indication information from the network device based on the scrambling identifier.

Figure 7:
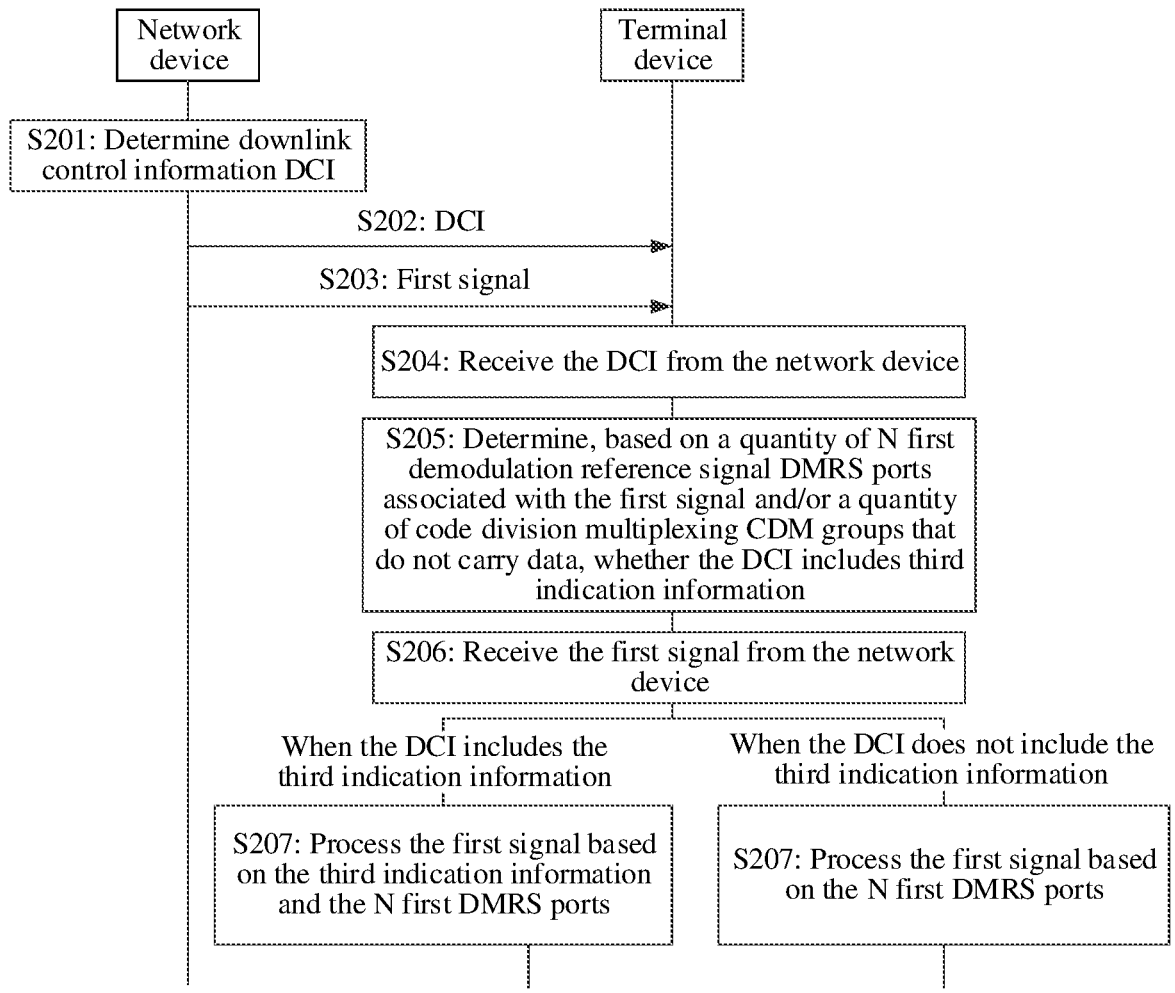
FIG. 7 is a schematic flowchart of still another signal transmission method according to at least one embodiment.

FIG. 7 is a schematic diagram of another signal transmission method 200 according to at least one embodiment. The signal transmission method 200 is also described from a perspective of interaction between a terminal device and a network device. The signal transmission method 200 includes but is not limited to the following steps.

S201: The network device determines downlink control information DCI.

S202: The network device sends the DCI to the terminal device.

S203: The network device sends a first signal to the terminal device.

S204: The terminal device receives the downlink control information DCI from the network device.

S205: The terminal device determines, based on a quantity of N first demodulation reference signal DMRS ports associated with the first signal and/or a quantity of code division multiplexing CDM groups that do not carry data, whether the DCI includes third indication information.

S206: The terminal device receives the first signal from the network device.

S207: In response to the DCI including the third indication information, the terminal device processes the first signal based on the third indication information and the N first DMRS ports; or in response to the DCI not including the third indication information, processes the first signal based on the N first DMRS ports.

In S201, in response to the quantity of N first DMRS ports associated with the first signal being less than a first preset value, and the quantity of CDM groups that do not carry data not being less than a second preset value, the DCI includes the third indication information indicating one or more second DMRS ports. Alternatively, the DCI includes the third indication information indicating a CDM group corresponding to one or more second DMRS ports, and all DMRS ports in the CDM group corresponding to the one or more second DMRS ports are second DMRS ports.

For example, as shown in FIG. 2, DMRS ports allocated by the network device to the terminal device are DMRS port 0 to DMRS port 5. The first DMRS ports associated with the first signal are DMRS port 0 and DMRS port 1. The first preset value is 4, the second preset value is 3, and the quantity of CDM groups that do not carry data is 3. Because the quantity of CDM groups that do not carry data is 3, and the first DMRS ports are in CDM group 0, the one or more second DMRS ports is in CDM group 1 or CDM group 2. In response to the network device not indicating the one or more second DMRS ports, or the network device not indicating the CDM group corresponding to the one or more second DMRS ports, the terminal device cannot determine the one or more second DMRS ports. Therefore, the DCI determined by the network device includes the third indication information indicating the one or more second DMRS ports, or the DCI includes the third indication information indicating the CDM group corresponding to the one or more second DMRS ports. To be specific, the third indication information indicates that the second DMRS ports are DMRS port 2 and DMRS port 3, or the third indication information indicates that the CDM group corresponding to the second DMRS ports is CDM group 2, and all DMRS ports in CDM group 2 are the second DMRS ports.

In another implementation, in response to the quantity of N first DMRS ports associated with the first signal not being less than the first preset value, or the quantity of CDM groups that do not carry data being less than the second preset value, the DCI does not include the third indication information.

For example, as shown in FIG. 2, DMRS ports allocated by the network device to the terminal device are DMRS port 0 to DMRS port 5. The first DMRS ports associated with the first signal are DMRS port 0 and DMRS port 1. In response to the first preset value being 2, that is, the quantity of first DMRS ports is equal to the first preset value, there is no interfering signal interfering with the first signal. Therefore, the network device does not indicate the second DMRS port or the CDM group corresponding to the second DMRS port to the terminal device, that is, the DCI does not include the third indication information. Alternatively, the second preset value is 3, and the quantity of CDM groups that do not carry data is 2. Because the quantity of CDM groups that do not carry data is 2, and the first DMRS ports that do not carry data are in CDM group 0, the second DMRS ports that do not carry data are only be in CDM group 1, that is, DMRS port 2 and DMRS port 3 in CDM group 1 are the second DMRS ports. Therefore, the network device does not indicate the second DMRS port or the CDM group corresponding to the second DMRS port to the terminal device either. In other words, the DCI does not include the third indication information.

In an implementation, the first preset value is a maximum quantity of receive antennas or a maximum quantity of data streams that are supported by the terminal device, and the second preset value is a maximum quantity of CDM groups configured by the network device. The quantity of first DMRS ports cannot be greater than the maximum quantity of receive antennas or the maximum quantity of data streams that are supported by the terminal device, and the quantity of CDM groups that do not carry data cannot be greater than the maximum quantity of CDM groups configured by the network device. Therefore, in response to the quantity of N first DMRS ports associated with the first signal being less than the first preset value, and the quantity of CDM groups that do not carry data being equal to the second preset value, the DCI includes the third indication information. Similarly, in response to the first preset value being the maximum quantity of receive antennas or the maximum quantity of data streams that are supported by the terminal device, the second preset value is the maximum quantity of CDM groups configured by the network device, and the quantity of N first DMRS ports associated with the first signal is not less than the first preset value or the quantity of CDM groups that do not carry data is less than the second preset value, the DCI does not include the third indication information.

For example, the first preset value is the maximum quantity of receive antennas supported by the terminal device, the first preset value is 3, the second preset value is the maximum quantity of CDM groups configured by the network device, the second preset value is 4, the quantity of first DMRS ports is 2, and the quantity of CDM groups that do not carry data is 4. In this case, the DCI includes the third indication information.

Based on the condition under which the DCI includes the third indication information, in S204, that the terminal device determines, based on a quantity of N first demodulation reference signal DMRS ports associated with the first signal and/or a quantity of code division multiplexing CDM groups that do not carry data, whether the DCI includes third indication information includes: In response to the quantity of N first DMRS ports associated with the first signal being less than the first preset value, and the quantity of CDM groups that do not carry data is not less than the second preset value, the terminal device determines that the DCI includes the third indication information. In response to the quantity of N first DMRS ports associated with the first signal not being less than the first preset value, or the quantity of CDM groups that do not carry data is less than the second preset value, the terminal device determines that the DCI does not include the third indication information. The DCI includes the third indication information under a specific condition, and the terminal device determines, under a corresponding condition, whether the DCI includes the third indication information.

In S205, the third indication information indicates the one or more second DMRS ports, or the CDM group corresponding to the one or more second DMRS ports. Therefore, in response to the DCI including the third indication information, that the terminal device processes the first signal based on the third indication information and the N first DMRS ports includes: The terminal device demodulates the first signal based on a DMRS corresponding to the N first DMRS ports and a DMRS corresponding to the one or more second DMRS ports. Alternatively, the terminal device demodulates the first signal based on a DMRS corresponding to the N first DMRS ports and a DMRS signal of a DMRS port in the CDM group corresponding to the one or more second DMRS ports. Specifically, the terminal device obtains first channel information through estimation based on the DMRS corresponding to the N first DMRS ports, and obtains second channel information through estimation based on the DMRS corresponding to the one or more second DMRS ports. Then, the terminal device demodulates the first signal based on the first channel information and the second channel information, to suppress an interfering signal.

In S205, in response to the DCI not including the third indication information, that the terminal device processes the first signal based on the N first DMRS ports includes: The terminal device determines the one or more second DMRS ports based on the N first DMRS ports and the quantity of CDM groups that do not carry data. The terminal device demodulates the first signal based on the DMRS corresponding to the N first DMRS ports and the DMRS corresponding to the one or more second DMRS ports.

For example, as shown in FIG. 2, DMRS ports allocated by the network device to the terminal device are DMRS port 0 to DMRS port 5. The first DMRS ports associated with the first signal are DMRS port 0 and DMRS port 1. The second preset value is 3, and the quantity of CDM groups that do not carry data is 2. Because the quantity of CDM groups that do not carry data is 2, and the first DMRS ports that do not carry data are in CDM group 0, the second DMRS ports that do not carry data are only in CDM group 1, that is, DMRS port 2 and DMRS port 3 in CDM group 1 are the second DMRS ports.

In an implementation, the DCI includes second indication information, and the second indication information indicates the N first DMRS ports and the quantity of CDM groups that do not carry data. The third indication information and the second indication information are carried in same DCI, and this manner also reduce signaling overheads of the network device.

In at least one embodiment, in response to the quantity of N first DMRS ports associated with the first signal being less than the first preset value, and the quantity of CDM groups that do not carry data not being less than the second preset value, the DCI sent by the network device to the terminal device includes the third indication information indicating the one or more second DMRS ports or the CDM group corresponding to one or more second DMRS ports. This helps the terminal device directly learn of a second DMRS port with strong interference, and then demodulates the first signal that is from the network device based on the second DMRS port and the first DMRS port, to suppress the interfering signal. This manner helps reduce processing complexity for the terminal device. In response to the quantity of N first DMRS ports associated with the first signal not being less than the first preset value, or the quantity of CDM groups that do not carry data being less than the second preset value, the DCI sent by the network device to the terminal device does not include the third indication information. The signaling overheads of the network device is reduced. In this case, the terminal device also determines, based on the first DMRS port and the quantity of CDM groups that do not carry data, the second DMRS port with strong interference, and demodulate the first signal that is from the network device. In this manner, the interfering signal is suppressed while the signaling overheads of the network device are reduced.

Figure 8:
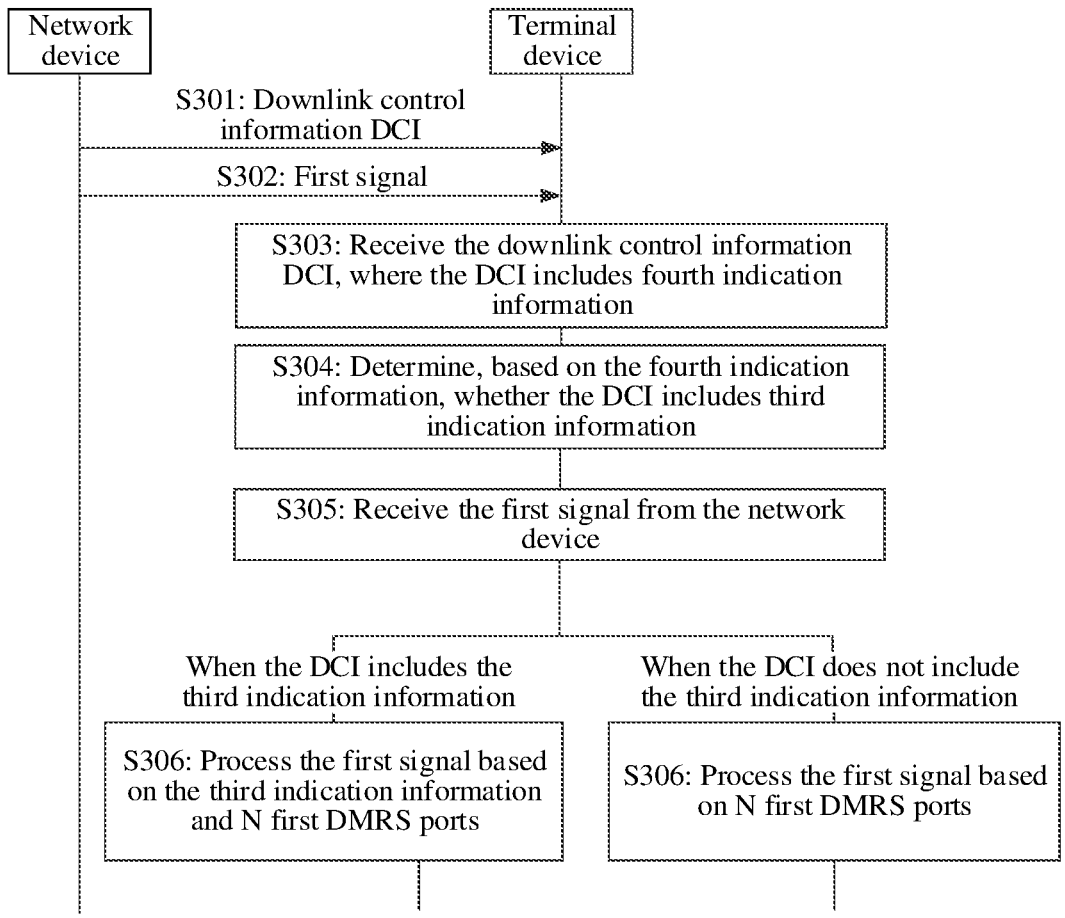
FIG. 8 is a schematic flowchart of still another signal transmission method according to at least one embodiment.

To further reduce signaling overheads of a network device, based on the signal transmission method 200, at least one embodiment provides still another signal transmission method 300 shown in FIG. 8. The signal transmission method 300 includes but is not limited to the following steps.

S301: The network device sends downlink control information DCI to a terminal device.

S302: The network device sends a first signal to the terminal device.

S303: The terminal device receives the downlink control information DCI, where the DCI includes fourth indication information.

S304: The terminal device determines, based on the fourth indication information, whether the DCI further includes third indication information.

S305: The terminal device receives the first signal from the network device.

S306: In response to determining that the DCI includes the third indication information, the terminal device processes the first signal based on the third indication information and N first DMRS ports; or in response to determining that the DCI does not include the third indication information, the terminal device processes the first signal based on N first DMRS ports associated with the first signal.

In S301, the DCI includes the fourth indication information. In response to indicating a first state, the fourth indication information indicates that the DCI includes the third indication information. In response to a quantity of N first demodulation reference signal DMRS ports associated with the first signal not being less than a first preset value, and a quantity of code division multiplexing CDM groups that do not carry data being less than a second preset value, the network device determines that the fourth indication information indicates the first state, where N is greater than or equal to 1. Alternatively, in response to a quantity of N first demodulation reference signal DMRS ports associated with the first signal not being less than a first preset value, or a quantity of code division multiplexing CDM groups that do not carry data being less than a second preset value, the network device determines that the fourth indication information indicates a second state.

In an implementation, as shown in Table 2, the fourth indication information indicates the first state or the second state by using an index.

TABLE 2

| Index | Content |
| --- | --- |
| 0 | First state |
| 1 | Second state |

In Table 2, in response to the index being 0, the fourth indication information indicates the first state; or in response to the index being 1, the fourth indication information indicates the second state.

In S304, in response to indicating the first state, the fourth indication information indicates that the DCI further includes the third indication information. Therefore, that the terminal device determines, based on the fourth indication information, whether the DCI further includes third indication information includes: In response to determining that the fourth indication information indicates the first state, the terminal device determines that the DCI includes the third indication information. In response to determining that the fourth indication information indicates the second state, the terminal device determines that the DCI does not include the third indication information.

In S306, in response to the DCI including the third indication information, an implementation in which the terminal device processes the first signal based on the third indication information is the same as related descriptions in S205. Details are not described again.

In S306, in response to the DCI not including the third indication information, an implementation in which the terminal device processes the first signal based on the N first DMRS ports associated with the first signal is the same as related descriptions in S205. Details are not described again.

In an implementation, the DCI includes second indication information, and the second indication information indicates the N first DMRS ports and the quantity of CDM groups that do not carry data. The third indication information, the fourth indication information, and the second indication information are carried in same DCI, and this manner also reduce signaling overheads of the network device.

In the signal transmission method 300, compared with the signal transmission method 200, the network device indicates, to the terminal device by using the states with lower signaling overheads, whether the DCI includes one or more second DMRS ports or a CDM group corresponding to one or more second DMRS ports. In this way, the terminal device determines the one or more second DMRS ports while reducing the signaling overheads of the network device, to demodulate the first signal based on the one or more second DMRS ports.

In the foregoing at least one embodiment, the method provided in at least one embodiment provides is described from a perspective of interaction between the network device and the terminal device. To implement functions in the method provided in the foregoing at least one embodiment, the network device and the terminal device includes a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 9:
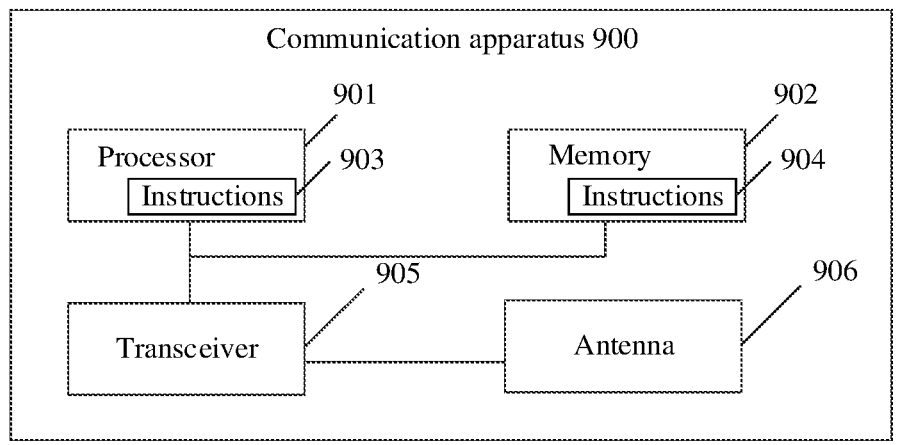
FIG. 9 is a schematic diagram of a structure of a communication apparatus according to at least one embodiment.

FIG. 9 is a schematic diagram of a structure of a communication apparatus. The communication apparatus 900 is a network device, is a terminal device, is a chip, a chip system, a processor, or the like that supports the network device in implementing the foregoing method, or is a chip, a chip system, a processor, or the like that supports the terminal device in implementing the foregoing method. The apparatus is configured to implement the method described in the foregoing method embodiments. For details, refer to the descriptions in the foregoing method embodiments.

The communication apparatus 900 includes one or more processors 901. The processor 901 is a general-purpose processor, a dedicated processor, or the like. For example, the processor 901 is a baseband processor or a central processing unit. The baseband processor is configured to process a communication protocol and communication data. The central processing unit is configured to: control a communication apparatus (for example, a base station, a baseband chip, a terminal, a terminal chip, a DU, or a CU), execute a software program, and process data of the software program.

Optionally, the communication apparatus 900 includes one or more memories 902. The memory 902 stores instructions 904, and the instructions is run on the processor 901, so that the communication apparatus 900 performs the method described in the foregoing method embodiments. Optionally, the memory 902 further stores data. The processor 901 and the memory 902 is disposed separately, or is integrated together.

Optionally, the communication apparatus 900 further includes a transceiver 905 and an antenna 906. The transceiver 905 is referred to as a transceiver unit, a transceiver circuit, or the like, and is configured to implement a transceiver function. The transceiver 905 includes a receiver and a transmitter. The receiver is referred to as a receiver circuit or the like, and is configured to implement a receiving function. The transmitter is referred to as a transmitter circuit or the like, and is configured to implement a sending function.

In response to the communication apparatus 900 being the network device, the processor 901 is configured to perform S101 in the signal transmission method 100 and perform S201 in the signal transmission method 200; and the transceiver 905 is configured to perform S102 and S103 in the signal transmission method 100, perform S202 and S203 in the signal transmission method 200, and perform S301 and S302 in the signal transmission method 300.

In response to the communication apparatus 900 being the terminal device, the transceiver 905 is configured to perform S104 in the signal transmission method 100, perform S204 in the signal transmission method 200, and perform S303 and S305 in the signal transmission method 300; and the processor 901 is configured to perform S105 in the signal transmission method 100, perform S205 and S206 in the signal transmission method 200, and perform S305 and S306 in the signal transmission method 300.

In at least one embodiment, the processor 901 includes a transceiver configured to implement receiving and sending functions. For example, the transceiver is a transceiver circuit, an interface, or an interface circuit. The transceiver circuit, the interface, or the interface circuit configured to implement the receiving and sending functions is separated, or is integrated together. The transceiver circuit, the interface, or the interface circuit is configured to read and write code/data. Alternatively, the transceiver circuit, the interface, or the interface circuit is configured to transmit or transfer a signal.

In at least one embodiment, optionally, the processor 901 stores instructions 903. In response to the instructions 903 being run on the processor 901, the communication apparatus 900 performs the method described in the foregoing method embodiments. The instructions 903 is fixed in the processor 901. In this case, the processor 901 is implemented by hardware.

In at least one embodiment, the communication apparatus 900 includes a circuit. The circuit implements a sending, receiving, or communication function in the foregoing method embodiments. The processor and the transceiver that are described in at least one embodiment provides is implemented on an integrated circuit (integrated circuit, IC), an analog IC, a radio frequency integrated circuit RFIC, a hybrid signal IC, an application-specific integrated circuit (application-specific integrated circuit, ASIC), a printed circuit board (printed circuit board, PCB), an electronic device, or the like. The processor and the transceiver is alternatively manufactured by using various IC technologies, for example, a complementary metal oxide semiconductor (complementary metal oxide semiconductor, CMOS), an N-type metal oxide semiconductor (nMetal-oxide-semiconductor, NMOS), a P-type metal oxide semiconductor (positive channel metal oxide semiconductor, PMOS), a bipolar junction transistor (Bipolar Junction Transistor, BJT), a bipolar CMOS (BiCMOS), silicon germanium (SiGe), and gallium arsenide (GaAs).

The communication apparatus in the foregoing embodiments is a network device or a terminal. However, a scope of the communication apparatus described in at least one embodiment provides is not limited thereto, and a structure of the communication apparatus is not limited by FIG. 9. The communication apparatus is an independent device or is a part of a large device. For example, the communication apparatus is:

(1) an independent integrated circuit IC, a chip, or a chip system or subsystem;
(2) a set of one or more ICs, where optionally, the IC set also includes a storage component configured to store data and instructions;
(3) an ASIC, for example, a modem (MSM);
(4) a module that is embedded in another device;
(5) a receiver, a terminal, an intelligent terminal, a cellular phone, a wireless device, a handset, a mobile unit, a vehicle-mounted device, a network device, a cloud device, an artificial intelligence device, or the like; and
(6) others.

Figure 10:
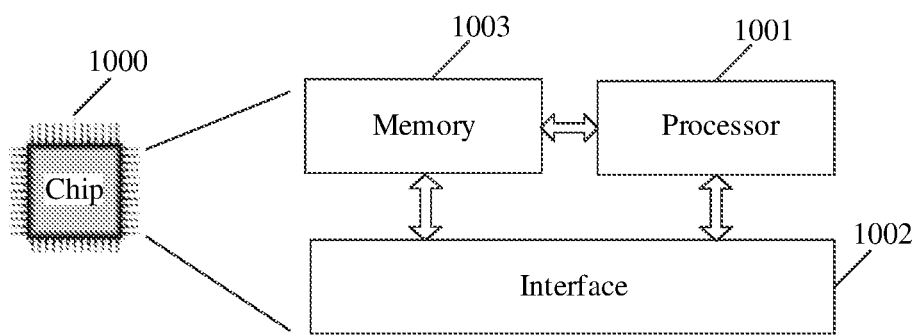
FIG. 10 is a schematic diagram of a structure of a chip according to at least one embodiment.

In response to the communication apparatus being the chip or the chip system, refer to a schematic diagram of a structure of a chip shown in FIG. 10. The chip 1000 shown in FIG. 10 includes a processor 1001 and an interface 1002. There is one or more processors 1001, and there is a plurality of interfaces 1002.

In a design, in response to the chip being configured to implement a function of a terminal device in at least one embodiment provides:

The interface 1002 is configured to receive first indication information and second indication information from a network device.

The interface 1002 is further configured to receive a first signal.

The processor 1001 is configured to process the first signal based on the first indication information and the second indication information. The first indication information indicates one or more demodulation reference signal DMRS port sets, the second indication information indicates N first DMRS ports associated with the first signal, and N is greater than or equal to 1.

Optionally, the chip further includes a memory 1003. The memory 1003 is configured to store program instructions and data that are necessary for the terminal device.

In another design, in response to the chip being configured to implement a function of a terminal device in at least one embodiment provides:

The interface 1002 is configured to receive downlink control information DCI from a network device.

The processor 1001 is configured to determine, based on a quantity of N first demodulation reference signal DMRS ports associated with a first signal and/or a quantity of code division multiplexing CDM groups that do not carry data, whether the DCI includes third indication information.

The interface 1002 is further configured to receive the first signal from the network device.

The processor 1001 is further configured to: in response to the DCI including the third indication information, process the first signal based on the third indication information and the N first DMRS ports; or in response to the DCI not including the third indication information, process the first signal based on the N first DMRS ports.

N is greater than or equal to 1. The third indication information indicates one or more second DMRS ports or a CDM group corresponding to one or more second DMRS ports, and the one or more second DMRS ports are different from the N first DMRS ports.

Optionally, the chip further includes a memory 1003. The memory 1003 is configured to store program instructions and data that are necessary for the terminal device.

In still another design, in response to the chip being configured to implement a function of a terminal device in at least one embodiment provides:

The interface 1002 is configured to receive downlink control information DCI.

The processor 1001 is configured to determine, based on fourth indication information in the DCI, whether the DCI includes third indication information.

The interface 1002 is further configured to receive a first signal from a network device.

The processor 1001 is further configured to: in response to the DCI including the third indication information, process the first signal based on the third indication information; or in response to the DCI not including the third indication information, process the first signal based on N first DMRS ports associated with the first signal, where N is greater than or equal to 1.

The DCI includes the fourth indication information. The fourth indication information indicates whether the DCI includes the third indication information. The third indication information indicates one or more second demodulation reference signal DMRS ports or a code division multiplexing CDM group corresponding to one or more second DMRS ports, and the one or more second DMRS ports are different from the N first DMRS ports associated with the first signal.

In a design, in response to the chip being configured to implement a function of a network device at least one embodiment provides:

The processor 1001 is configured to determine first indication information and second indication information.

The interface 1002 is configured to send the first indication information and the second indication information to a terminal device.

The interface 1002 is further configured to send a first signal to the terminal device.

The first indication information indicates one or more demodulation reference signal DMRS port sets, and the second indication information indicates N first DMRS ports associated with the first signal, where N is greater than or equal to 1.

Optionally, the chip further includes a memory 1003. The memory 1003 is configured to store program instructions and data that are necessary for the network device.

In another design, in response to the chip being configured to implement a function of a network device at least one embodiment provides:

The processor 1001 is configured to determine downlink control information DCI.

The interface 1002 is configured to send the DCI to a terminal device.

The interface 1002 is further configured to send a first signal to the terminal device.

In response to a quantity of N first DMRS ports associated with the first signal being less than a first preset value, and a quantity of CDM groups that do not carry data not being less than a second preset value, the DCI includes third indication information. The third indication information indicates one or more second DMRS ports or a CDM group corresponding to one or more second DMRS ports, the one or more second DMRS ports are different from the N first DMRS ports, and N is greater than or equal to 1.

Optionally, the chip further includes a memory 1003. The memory 1003 is configured to store program instructions and data that are necessary for the network device.

In still another design, in response to the chip being configured to implement a function of a network device at least one embodiment provides:

The interface 1002 is configured to send downlink control information DCI to a terminal device.

The interface 1002 is further configured to send a first signal to the terminal device.

The DCI includes fourth indication information. In response to indicating a first state, the fourth indication information indicates that the DCI includes third indication information. The third indication information indicates one or more second demodulation reference signal DMRS ports or a code division multiplexing CDM group corresponding to one or more second demodulation reference signal DMRS ports, and the one or more second DMRS ports are different from N first DMRS ports associated with the first signal.

Optionally, the chip further includes a memory 1003. The memory 1003 is configured to store program instructions and data that are necessary for the network device.

A person skilled in the art further understands that various illustrative logical blocks (illustrative logic blocks) and steps (steps) that are listed in at least one embodiment provides is implemented by using electronic hardware, computer software, or a combination thereof. Whether the functions are implemented by using hardware or software depends on particular applications and a design requirement of the entire system. A person skilled in the art is able to use various methods to implement the described functions for each particular application, but the implementation does not goes beyond the scope of embodiments described herein.

At least one embodiment shown in the signal transmission method 100 to the signal transmission method 300 are based on a same concept, and technical effects brought by the embodiments are also the same. For specific principles, refer to the descriptions of embodiments shown in the signal transmission method 100 to the signal transmission method 300. Details are not described herein again.

Figure 11:
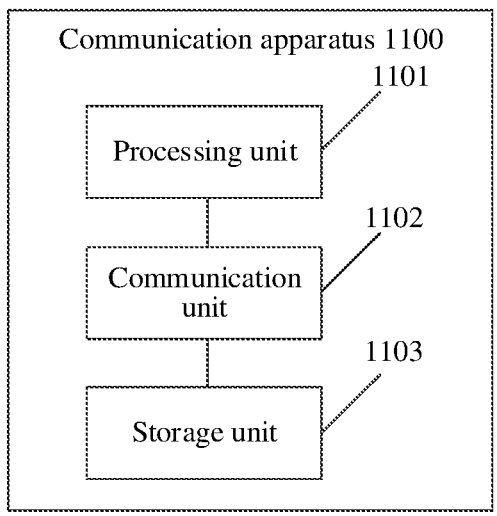
FIG. 11 is a schematic diagram of a structure of another communication apparatus according to at least one embodiment.

As shown in FIG. 11, at least one embodiment provides another communication apparatus 1100. The communication apparatus is a terminal device, or is a component (for example, an integrated circuit or a chip) of the terminal device. Alternatively, the communication apparatus is a network device or a component (for example, an integrated circuit or a chip) of the network device. Alternatively, the communication apparatus is another communication unit, configured to implement methods in at least one embodiment. The communication apparatus 1100 includes a processing unit 1101. Optionally, the communication apparatus 1100 further includes a communication unit 1102 and a storage unit 1103.

In at least one embodiment, one or more units in FIG. 11 is implemented by one or more processors, is implemented by one or more processors and memories, is implemented by one or more processors and transceivers, or is implemented by one or more processors, memories, and transceivers. This is not limited in at least one embodiment. The processor, the memory, and the transceiver is disposed separately, or is integrated.

The communication apparatus implements functions of the terminal device or the network device described in at least one embodiment provides. For example, the communication apparatus includes a corresponding module, unit, or means (means) for performing the steps of the terminal device in at least one embodiment by the terminal device. The function, the unit, or the means (means) is implemented by software, is implemented by hardware, is implemented by hardware executing corresponding software, or is implemented in a combination of software and hardware. For details, refer to the corresponding descriptions in the foregoing corresponding method embodiments.

In at least one embodiment, the communication apparatus 1100 includes the processing unit 1101 and the communication unit 1102.

The communication unit 1102 is configured to receive first indication information and second indication information from a network device.

The communication unit 1102 is further configured to receive a first signal from the network device.

The processing unit 1101 is configured to process the first signal based on the first indication information and the second indication information.

The first indication information indicates one or more demodulation reference signal DMRS port sets, and the second indication information indicates N first DMRS ports associated with the first signal, where N is greater than or equal to 1.

For an optional implementation of at least one embodiment, refer to related content in the signal transmission method 110 in the foregoing method embodiment. Details are not described herein again.

In at least one embodiment, the communication apparatus 1100 includes the processing unit 1101 and the communication unit 1102.

The processing unit 1101 is configured to determine first indication information and second indication information.

The communication unit 1102 is configured to send the first indication information and the second indication information to a terminal device.

The communication unit 1102 is further configured to send a first signal to the terminal device.

The first indication information indicates one or more demodulation reference signal DMRS port sets, and the second indication information indicates N first DMRS ports associated with the first signal, where N is greater than or equal to 1.

For an optional implementation of at least one embodiment, refer to related content in the signal transmission method 100 in the foregoing method embodiment. Details are not described herein again.

In at least one embodiment, the communication apparatus 1100 includes the processing unit 1101 and the communication unit 1102.

The communication unit 1102 is configured to receive downlink control information DCI from a network device.

The processing unit 1101 is configured to determine, based on a quantity of N first demodulation reference signal DMRS ports associated with a first signal and/or a quantity of code division multiplexing CDM groups that do not carry data, whether the DCI includes third indication information, and N is greater than or equal to 1.

The communication unit 1102 is further configured to receive the first signal from the network device.

The processing unit 1101 is further configured to: in response to the DCI including the third indication information, process the first signal based on the third indication information and the N first DMRS ports; or in response to the DCI not including the third indication information, process the first signal based on the N first DMRS ports.

The third indication information indicates one or more second DMRS ports or a CDM group corresponding to one or more second DMRS ports, and the one or more second DMRS ports are different from the N first DMRS ports.

For an optional implementation of at least one embodiment, refer to related content in the signal transmission method 200 in the foregoing method embodiment. Details are not described herein again.

In at least one embodiment, the communication apparatus 1100 includes the processing unit 1101 and the communication unit 1102.

The processing unit 1101 is configured to determine downlink control information DCI, where in response to a quantity of N first DMRS ports associated with a first signal being less than a first preset value, and a quantity of CDM groups that do not carry data not being less than a second preset value, the DCI includes third indication information.

The communication unit 1102 is configured to send the DCI to a terminal device.

The communication unit 1102 is further configured to send the first signal to the terminal device.

The third indication information indicates one or more second DMRS ports or a CDM group corresponding to one or more second DMRS ports, the one or more second DMRS ports are different from the N first DMRS ports, and N is greater than or equal to 1.

For an optional implementation of at least one embodiment, refer to related content in the signal transmission method 200 in the foregoing method embodiment. Details are not described herein again.

In at least one embodiment, the communication apparatus 1100 includes the processing unit 1101 and the communication unit 1102.

The communication unit 1102 is configured to receive downlink control information DCI.

The processing unit 1101 is configured to determine, based on fourth indication information in the DCI, whether the DCI includes third indication information.

The communication unit 1102 is configured to receive a first signal from a network device.

The processing unit 1101 is configured to: in response to the DCI including the third indication information, process the first signal based on the third indication information; or in response to the DCI not including the third indication information, process the first signal based on N first DMRS ports associated with the first signal, where N is greater than or equal to 1.

The DCI includes the fourth indication information. The fourth indication information indicates whether the DCI includes the third indication information. The third indication information indicates one or more second demodulation reference signal DMRS ports or a code division multiplexing CDM group corresponding to one or more second DMRS ports, and the one or more second DMRS ports are different from the N first DMRS ports associated with the first signal.

For an optional implementation of at least one embodiment, refer to related content in the signal transmission method 300 in the foregoing method embodiment. Details are not described herein again.

In at least one embodiment, the communication apparatus 1100 includes the communication unit 1102.

The communication unit 1102 is configured to send downlink control information DCI to a terminal device.

The communication unit 1102 is further configured to send the first signal to the terminal device.

The DCI includes fourth indication information. In response to indicating a first state, the fourth indication information indicates that the DCI includes third indication information. The third indication information indicates one or more second demodulation reference signal DMRS ports or a code division multiplexing CDM group corresponding to one or more second demodulation reference signal DMRS ports, and the one or more second DMRS ports are different from N first DMRS ports associated with the first signal.

For an optional implementation of at least one embodiment, refer to related content in the signal transmission method 300 in the foregoing method embodiment. Details are not described herein again.

In at least one embodiment shown in the signal transmission method 100 to the signal transmission method 300 are based on a same concept, and technical effects brought by the embodiments are also the same. For specific principles, refer to the descriptions of embodiments shown in the signal transmission method 100 to the signal transmission method 300. Details are not described herein again.

In some scenarios, some optional features in at least one embodiment is independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, the communication apparatus provided in at least one embodiment also implements these features or functions. Details are not described herein again.

A person skilled in the art further understands that various illustrative logical blocks (illustrative logic blocks) and steps (steps) that are listed in at least one embodiment is implemented by using electronic hardware, computer software, or a combination thereof. Whether the functions are implemented by using hardware or software depends on particular applications and a design of the entire system.

The processor in at least one embodiment provides is an integrated circuit chip, and has a signal processing capability. In an implementation process, steps in the foregoing method embodiments is implemented by using a hardware integrated logical circuit in the processor, or by using instructions in a form of software. The foregoing processor is a general-purpose processor, a digital signal processor (digital signal processor, DSP), an application-specific integrated circuit (application-specific integrated circuit, ASIC), a field programmable gate array (field programmable gate array, FPGA), another programmable logic device, a discrete gate or transistor logic device, or a discrete hardware component.

The memory in at least one embodiment provides is a volatile memory or a nonvolatile memory, or includes a volatile memory and a nonvolatile memory. The nonvolatile memory is a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory is a random access memory (random access memory, RAM), used as an external cache. By way of example but not limitation, many forms of RAMs is used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). The memory of the systems and methods described in this specification includes but is not limited to these and any memory of another proper type.

Embodiments described herein provide a computer-readable medium, configured to store computer software instructions. In response to the instructions being executed by a communication apparatus, the method according to the first aspect is implemented.

Embodiments described herein provide a computer program product, configured to store computer software instructions. In response to the instructions being executed by a communication apparatus, the method according to the second aspect is implemented.

Embodiments described herein provide a computer program product, configured to store computer software instructions. In response to the instructions being executed by a communication apparatus, the method according to the third aspect is implemented.

Embodiments described herein provide a computer program product, configured to store computer software instructions. In response to the instructions being executed by a communication apparatus, the method according to the fourth aspect is implemented.

Embodiments described herein provide a computer program product, configured to store computer software instructions. In response to the instructions being executed by a communication apparatus, the method according to the fifth aspect is implemented.

Embodiments described herein provide a computer program product, configured to store computer software instructions. In response to the instructions being executed by a communication apparatus, the method according to the sixth aspect is implemented.

All or a part of the foregoing embodiments is implemented by using software, hardware, firmware, or any combination thereof. In response to software being used to implement embodiments, all or a part of the embodiments is implemented in a form of a computer program product. The computer program product includes one or more computer instructions. In response to the computer instructions being loaded and executed on a computer, the procedure or functions according to at least one embodiment are all or partially generated. The computer is a general-purpose computer, a dedicated computer, a computer network, or other programmable apparatuses. The computer instructions is stored in a computer-readable storage medium or is transmitted from a computer-readable storage medium to another computer-readable storage medium. For example, the computer instructions is transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium is any usable medium accessible by the computer, or a data storage device, for example, a server or a data center, integrating one or more usable media. The usable medium is a magnetic medium (for example, a floppy disk, a hard disk, or a magnetic tape), an optical medium (for example, a high-density digital video disc (digital video disc, DVD)), a semiconductor medium (for example, a solid-state drive (solid-state drive, SSD)), or the like.

The foregoing descriptions are merely specific implementations of at least one embodiment, but are not intended to limit the protection scope of embodiments described herein. Any variation or replacement readily figured out by a person skilled in the art shall fall within the protection scope of embodiments described herein. Therefore, the protection scope of embodiments described herein shall be subject to the protection scope of the claims.

What is claimed is:

1. A signal transmission method, wherein the method comprises:
    receiving downlink control information DCI from a network device;
    receiving first indication information usable to indicate one or more demodulation reference signal DMRS port sets, second indication information is usable to indicate N first DMRS ports associated with a first signal, or the second indication information is usable to indicate N first DMRS ports and a quantity of CDM groups that do not carry data, where N is greater than or equal to 1, third indication information usable to indicate one or more second DMRS ports or a CDM group corresponding to one or more second DMRS ports, and fourth indication information usable to indicate whether the DCI further includes the third indication information, wherein the one or more second DMRS ports are different from the N first DMRS ports;
    determining, based on a quantity of N first demodulation reference signal DMRS ports associated with the first signal and/or a quantity of code division multiplexing CDM groups that do not carry data, whether the DCI includes the third indication information;
    receiving the first signal from the network device; and
    in response to determining that the DCI includes the third indication information, processing, the first signal based on the third indication information and the N first DMRS ports; or
    in response to determining that the DCI does not include the third indication information, processing the first signal based on the N first DMRS ports.

2. The method according to claim 1, wherein the determining based on a quantity of N first demodulation reference signal DMRS ports associated with a first signal and/or a quantity of code division multiplexing CDM groups that do not carry data, whether the DCI includes third indication information includes:
    in response to the quantity of N first DMRS ports associated with the first signal being less than a first preset value, and the quantity of CDM groups that do not carry data not being less than a second preset value, determining that the DCI includes the third indication information; or
    in response to the quantity of N first DMRS ports associated with the first signal not being less than a first preset value, or the quantity of CDM groups that do not carry data being less than a second preset value, determining that the DCI does not include the third indication information.

3. The method according to claim 1, wherein in response to the DCI including the third indication information, the processing the first signal based on the third indication information and the N first DMRS ports includes:
    demodulating the first signal based on a DMRS corresponding to the N first DMRS ports and a DMRS corresponding to the one or more second DMRS ports; or
    demodulating the first signal based on a DMRS corresponding to the N first DMRS ports and a DMRS signal of a DMRS port in the CDM group corresponding to the one or more second DMRS ports.

4. The method according to claim 1, wherein in response to the DCI not including the third indication information, the processing the first signal based on the N first DMRS ports includes:
    determining the one or more second DMRS ports based on the N first DMRS ports and the quantity of CDM groups that do not carry data; and
    demodulating the first signal based on a DMRS corresponding to the N first DMRS ports and a DMRS corresponding to the one or more second DMRS ports.

5. The method according to claim 1, wherein
    a first preset value is a maximum quantity of receive antennas or a maximum quantity of data streams that are supported by a terminal device, and a second preset value is a maximum quantity of CDM groups configured by the network device.

6. A signal transmission method, wherein the method comprises:
    determining downlink control information DCI, wherein when a quantity of N first DMRS ports associated with a first signal is less than a first preset value, and a quantity of CDM groups that do not carry data is not less than a second preset value, and determining that the DCI includes first indication information, second indication information, third indication information, and fourth indication information, wherein the first indication information usable to indicate one or more demodulation reference signal DMRS port sets, the second indication information is usable to indicate N first DMRS ports associated with a first signal, or the second indication information is usable to indicate N first DMRS ports and a quantity of CDM groups that do not carry data, where N is greater than or equal to 1, the third indication information is usable to indicate one or more second DMRS ports or a CDM group corresponding to one or more second DMRS ports, and the fourth indication information is usable to indicate whether the DCI further includes the third indication information, the one or more second DMRS ports are different from the N first DMRS ports, and N is greater than or equal to 1, and the one or more second DMRS ports are different from the N first DMRS ports; and sending the DCI to a terminal device, and sending the first signal to the terminal device.

7. The method according to claim 6, wherein the first preset value is a maximum quantity of receive antennas or a maximum quantity of data streams that are supported by the terminal device, and the second preset value is a maximum quantity of CDM groups configured by a network device.

8. The method of claim 6, further comprising:

in response to determining that the DCI includes the third indication information, processing, the first signal based on the third indication information and the N first DMRS ports; or in response to determining that the DCI does not include the third indication information, processing the first signal based on the N first DMRS ports.

9. A communication apparatus, comprising:

a memory storing programming instructions; and at least one processor connected to the memory, wherein the processor is configured to execute the programming instructions to perform operations for:

receiving downlink control information DCI from a network device;

receiving first indication information usable to indicate one or more demodulation reference signal DMRS port sets, second indication information is usable to indicate N first DMRS ports associated with a first signal, or the second indication information is usable to indicate N first DMRS ports and a quantity of CDM groups that do not carry data, where N is greater than or equal to 1, third indication information usable to indicate one or more second DMRS ports or a CDM group corresponding to one or more second DMRS ports, and fourth indication information usable to indicate whether the DCI further includes the third indication information, wherein the one or more second DMRS ports are different from the N first DMRS ports;

determining, based on a quantity of N first demodulation reference signal DMRS ports associated with the first signal and/or a quantity of code division multiplexing CDM groups that do not carry data, whether the DCI includes the third indication information;

receiving the first signal from the network device; and in response to determining that the DCI includes the third indication information, processing, the first signal based on the third indication information and the N first DMRS ports; or in response to determining that the DCI does not include the third indication information, processing the first signal based on the N first DMRS ports.

10. The apparatus according to claim 9, wherein the at least one processor is further configured to determine based on a quantity of N first demodulation reference signal DMRS ports associated with a first signal and/or a quantity of code division multiplexing CDM groups that do not carry data, whether the DCI includes third indication information by:

in response to the quantity of N first DMRS ports associated with the first signal being less than a first preset value, and the quantity of CDM groups that do not carry data not being less than a second preset value, determining that the DCI comprises the third indication information; or in response to the quantity of N first DMRS ports associated with the first signal not being less than the first preset value, or the quantity of CDM groups that do not carry data being less than the second preset value, determining that the DCI does not comprise the third indication information.

11. The apparatus according to claim 9, wherein the at least one processor is further configured to in response to the DCI including the third indication information, process the first signal based on the third indication information and the N first DMRS ports by:

demodulating the first signal based on a DMRS corresponding to the N first DMRS ports and a DMRS corresponding to the one or more second DMRS ports; or demodulating the first signal based on a DMRS corresponding to the N first DMRS ports and a DMRS signal of a DMRS port in the CDM group corresponding to the one or more second DMRS ports.

12. The apparatus according to claim 9, wherein the at least one processor is further configured to in response to the DCI not including the third indication information, process the first signal based on the N first DMRS ports by:

determining the one or more second DMRS ports based on the N first DMRS ports and the quantity of CDM groups that do not carry data; and demodulating the first signal based on a DMRS corresponding to the N first DMRS ports and a DMRS corresponding to the one or more second DMRS ports.

13. The apparatus according to claim 9, wherein a first preset value is a maximum quantity of receive antennas or a maximum quantity of data streams that are supported by the at least one processor, and a second preset value is a maximum quantity of CDM groups configured by the network device.

14. A communication apparatus, comprising:

a memory storing programming instructions; and at least one processor connected to the memory, wherein the processor is configured to execute the programming instructions to perform operations for:

determining downlink control information DCI, wherein when a quantity of N first DMRS ports associated with a first signal is less than a first preset value, and a quantity of CDM groups that do not carry data is not less than a second preset value, and determining that the DCI includes first indication information, second indication information, third indication information, and fourth indication information, wherein the first indication information usable to indicate one or more demodulation reference signal DMRS port sets, the second indication information is usable to indicate N first DMRS ports associated with a first signal, or the second indication information is usable to indicate N first DMRS ports and a quantity of CDM groups that do not carry data, where N is greater than or equal to 1, the third indication information is usable to indicate one or more second DMRS ports or a CDM group corresponding to one or more second DMRS ports, and fourth indication information usable to indicate whether the DCI further includes the third indication information, wherein the one or more second DMRS ports are different from the N first DMRS ports, and N is greater than or equal to 1, and the one or more second DMRS ports are different from the N first DMRS ports; and sending the DCI to a terminal device, and sending the first signal to the terminal device.

15. The apparatus according to claim 14, wherein the first preset value is a maximum quantity of receive antennas or a maximum quantity of data streams that are supported by the terminal device, and the second preset value is a maximum quantity of CDM groups configured by the at least one processor.

16. The apparatus according to claim 14, wherein the processor is further configured to:

in response to determining that the DCI includes the third indication information, process, the first signal based on the third indication information and the N first DMRS ports; or in response to determining that the DCI does not include the third indication information, process the first signal based on the N first DMRS ports.

\* \* \* \* \*